United States Patent
Nation et al.

(10) Patent No.: US 11,781,958 B2
(45) Date of Patent: Oct. 10, 2023

(54) FRICTION TESTING AND TORQUE SENSING SYSTEMS

(71) Applicant: National Technology & Engineering Solutions of Sandia, LLC, Albuquerque, NM (US)

(72) Inventors: Brendan L. Nation, Albuquerque, NM (US); Michael T. Dugger, Tijeras, NM (US); John Curry, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 58 days.

(21) Appl. No.: 17/399,954

(22) Filed: Aug. 11, 2021

(65) Prior Publication Data

US 2021/0372898 A1    Dec. 2, 2021

Related U.S. Application Data

(62) Division of application No. 16/513,197, filed on Jul. 16, 2019, now Pat. No. 11,199,485.

(60) Provisional application No. 62/714,384, filed on Aug. 3, 2018.

(51) Int. Cl.
| | |
|---|---|
| *G01N 3/00* | (2006.01) |
| *G01N 3/56* | (2006.01) |
| *G01N 21/27* | (2006.01) |
| *G01L 3/08* | (2006.01) |
| *G01N 3/02* | (2006.01) |

(52) U.S. Cl.
CPC .................. *G01N 3/56* (2013.01); *G01L 3/08* (2013.01); *G01N 3/02* (2013.01); *G01N 21/27* (2013.01); *G01N 2201/063* (2013.01); *G01N 2201/08* (2013.01)

(58) Field of Classification Search
CPC ........... G01N 3/56; G01N 3/02; G01N 21/27; G01N 2201/063; G01N 2201/08; G01L 3/08

See application file for complete search history.

(56) References Cited

U.S. PATENT DOCUMENTS

| | | |
|---|---|---|
| 4,664,239 A | 5/1987 | Symes et al. |
| 5,685,554 A | 11/1997 | Poxleitner |
| 7,832,697 B2 | 11/2010 | West et al. |
| 8,071,164 B1 | 12/2011 | Dugger et al. |
| 9,474,540 B2 | 10/2016 | Stokes et al. |
| 10,024,484 B2 | 7/2018 | Brown et al. |
| 10,371,598 B1 | 8/2019 | Nation et al. |
| 10,429,284 B1 | 10/2019 | Nation et al. |
| 10,627,050 B1 | 4/2020 | Nation et al. |

(Continued)

OTHER PUBLICATIONS

U.S. Appl. No. 15/649,496, filed Jul. 13, 2017 (non-publication, abandoned Aug. 31, 2020).

(Continued)

*Primary Examiner* — Max H Noori
(74) *Attorney, Agent, or Firm* — Kevin W. Bieg; Helen S. Baca

(57) ABSTRACT

The present invention relates, in part, to systems for characterizing force (e.g., friction, wear, and/or torque). In one embodiment, the system allows for wear testing of samples in a high throughput manner. In another embodiment, the system allows for torque sensing in a non-contact manner.

5 Claims, 16 Drawing Sheets

(56) References Cited

U.S. PATENT DOCUMENTS

| | | | |
|---|---|---|---|
| 10,763,000 B1 | 9/2020 | Argibay et al. | |
| 10,941,485 B2 | 3/2021 | Argibay et al. | |
| 10,946,703 B2 | 3/2021 | Perotti | |
| 2014/0334991 A1 | 11/2014 | Johnson et al. | |
| 2016/0195183 A1* | 7/2016 | Matsuda | F16C 19/364 |
| | | | 464/97 |
| 2021/0372898 A1* | 12/2021 | Nation | G01L 3/08 |
| 2022/0283327 A1* | 9/2022 | Mueller | G01C 11/06 |
| 2022/0330843 A1* | 10/2022 | Saini | A61B 5/076 |
| 2022/0395840 A1* | 12/2022 | Reznitchenko | B02C 25/00 |
| 2023/0000567 A1* | 1/2023 | Flexman | A61B 5/0084 |

OTHER PUBLICATIONS

Davidson, M. et al., "High Throughput Friction and Wear Tester," Sandia Report No. SAND2019-0897M, 2019 (2 pp.).

Nation, B.L. et al., "In-Situ Testing: An Exploration of Increasing Design Complexity," Sandia Report No. SAND2015-10978C, 2015 (21 pp.).

Nation, B.L. et al., "In-Situ Exploration of Lubricating Fluid Properties in Confined Mechanical Contacts," Sandia Report No. SAND2015-3865C, 2015 (24 pp.).

* cited by examiner

FRICTION TESTING AND TORQUE SENSING SYSTEMS

CROSS-REFERENCE TO RELATED APPLICATIONS

This application is a divisional of application Ser. No. 16/513,197, filed Jul. 16, 2019, which application claims the benefit of U.S. Provisional Application No. 62/714,384, filed Aug. 3, 2018, both of which are hereby incorporated by reference in their entirety.

STATEMENT OF GOVERNMENT INTEREST

This invention was made with Government support under Contract No. DE-NA0003 525 awarded by the United States Department of Energy/National Nuclear Security Administration. The Government has certain rights in the invention.

FIELD OF THE INVENTION

The present invention relates, in part, to systems for characterizing force (e.g., friction, wear, and/or torque). In one embodiment, the system allows for wear testing of samples in a high throughput manner. In another embodiment, the system allows for torque sensing in a non-contact manner.

BACKGROUND OF THE INVENTION

Current state-of-the-art generally relies on single sample testing of material characteristics. Standardized methods typically require a particular testing speed to obtain performance results, such that increasing the testing speed is not a viable strategy to increase throughput or to enhance resolution. Accordingly, there is a need for improved testers (e.g., wear testing, friction testing, and/or torque testing).

SUMMARY OF THE INVENTION

The present invention relates to advanced systems for wear testing and/or torque sensing. In a first aspect, the present invention features a system including: a plurality of testers; a mount plate including a plurality of sample holders, where the distal end of at least one load arm is disposed in proximity to at least one sample holder; and a stage configured to position and/or move the mount plate.

In some embodiments, a tester (e.g., each tester) tester includes: a load arm having a proximal end and a distal end; a ball or pin holder disposed on the distal end of the load arm; a joint disposed on the proximal end of the load arm; and a load cell attached to the joint.

In some embodiments, the distal end of the load arm includes a plurality of attachment positions. In other embodiments, the distal end of the load arm further includes a weight cup configured to hold one or more weights. In some embodiments, each load arm is disposed in proximity to each sample holder.

In some embodiments, at least two load arms are disposed in proximity to one of the plurality of sample holders.

In some embodiments, the system further includes: one or more load cell mounts configured to attach to one or more load cells; and a housing configured to support the stage, the mount plate, and/or the one or more load cell mounts.

In some embodiments, the system further includes: a liquid testing cell in proximity to the mount plate, where the liquid testing cell is configured to provide a liquid environment in proximity to the plurality of sample holders.

In some embodiments, the system further includes: a plurality of load actuators, where each load actuator is configured to apply a load to the ball or pin holder and where each load actuator is located in proximity to the distal end of the load arm.

In some embodiments, the system further includes: a frame configured to provide at least one load actuator in proximity to the distal end of each load arm.

In some embodiments, the system further includes: an optical spectroscopy assembly configured to transmit an optical signal to each sample holder. In further embodiments, the optical spectroscopy assembly is disposed on the distal end of each load arm. In other embodiments, the optical spectroscopy assembly includes: a fiber optic cable configured to provide the optical signal; an objective assembly configured to focus the optical signal provided by the fiber optic cable, thereby providing a focused optical signal; a half-ball lens disposed within the ball or pin holder; an optical fiber configured to transmit the focused optical signal from the objective assembly to the half-ball lens; and an optional collection fiber configured to collect an optical signal emitting from the half-ball lens.

In some embodiments, the system further includes: a frame configured to provide at least one optical spectroscopy assembly in proximity to the distal end of each load arm. In some embodiments, the optical spectroscopy assembly is configured to receive or transmit one or more optical signals from and to an optical multiplexer.

In a second aspect, the present invention features a system including: a flexure disposed around an internal shaft, where the flexure includes a first end and a second end; a drive input shaft coupled to the first end of the flexure; a drive output shaft coupled to the second end of the flexure; a reference encoder coupled to the drive input shaft, where the reference encoder is configured to provide a first output signal; and a measurement encoder coupled to the drive output shaft, where the reference encoder is configured to provide a second output signal.

In some embodiments, the system further includes: a first optical reader coupled to the reference encoder, where the first optical reader is configured to receive and/or transmit the first output signal; and a second optical reader coupled to the measurement encoder, where the second optical reader is configured to receive and/or transmit the second output signal.

In some embodiments, the flexure is configured to provide an angular deflection upon application of torque to the drive input shaft.

In some embodiments, the angular deflection results in a phase difference between the first output signal of the reference encoder and the second output signal of the measurement encoder.

In some embodiments, the reference encoder and the measurement encoder are rotatably disposed about a common axis. In some embodiments, the internal shaft, the drive input shaft, and the drive output shaft are aligned along the common axis.

Additional details are provided herein.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates, in part, to systems for characterizing force (e.g., friction, wear, and/or torque). In one embodiment, the system allows for wear testing of samples in a high throughput manner. In another embodiment, the system allows for torque sensing in a non-contact manner.

Systems for Wear Testing

The present invention relates, in part, to a system for wear testing in a high throughput manner. In one embodiment, the system includes a plurality of testers, in which each tester can be independently controlled to apply a particular force to the sample(s). In one non-limiting embodiment, each tester is in proximity to one sample, thereby allowing each tester to conduct wear tests on each sample in an independent manner. In another non-limiting embodiment, a plurality of testers is in proximity to one sample, thereby allowing each tester to conduct wear tests on different portions of the same sample.

Each tester can include one or more components to apply a force to a sample surface. In one embodiment, a tester includes a load arm having a proximal end and a distal end. Whereas the distal end is free and located in proximity to the sample, the proximal end is attached to a frame or mount. The distal end can be associated with one or more ball holders having a ball, in which the ball is used to apply a force to the sample surface. Alternatively, the distal end can be associated with one or more pin holders having a pin, in which the pin is used to apply a force to the sample surface Furthermore, the distal end can include one or more attachment positions, in which each attachment position can be configured to be attached to a ball holder, a pin holder, a load (e.g., a deadweight load), a weight cup (e.g., configured to hold one or more weights, thereby providing a load), and/or an electronic actuator load (e.g., configured to apply a load upon activation of an electromagnetic coil).

A joint (e.g., low friction yoke) can be disposed on the proximal end of the load arm, which can facilitate pivoting and rotating of the load arm (e.g., to facilitate changing of the ball holder or pin holder). A loading cell can also be provided in proximity to the proximal end of the load arm, thereby allowing applied forces to be measured.

Generally, wear tests can include contacting the test surface with a material (e.g., provided as a ball) under a particularized motion track. The motion track can be implemented by maintaining the ball in a stationary position and moving the sample (e.g., by use of a motion stage and/or a positioning stage). The sample, in turn, can be provided in a mount plate, which can include a plurality of sample holders. Each holder can be configured to provide a separate sample. Furthermore, the sample holder can be configured to provide at least one sample in proximity to the distal end of at least one load arm, thereby allowing the ball to contact the sample surface.

Figure 1A:
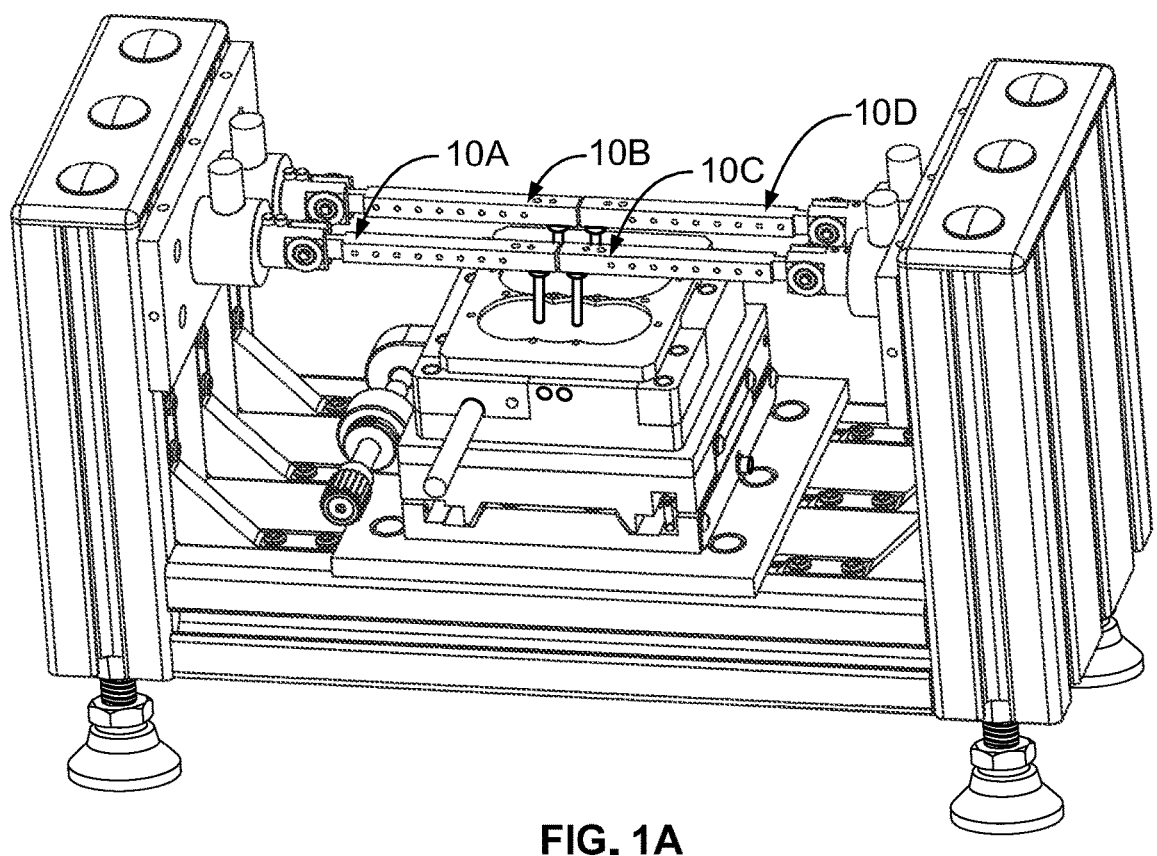
FIG. 1A-1C shows schematics of an exemplary system for wear testing. Provided are (A) an exemplary system without an enclosure and (B,C) various components of an exemplary system.

FIG. 1A shows an exemplary system for wear testing, in which the system includes four testers 10A-10D. Any number of useful testers can be present, e.g., two, three, four, five, six, etc. within the system. Each tester can be attached directly or indirectly to a housing, in which the housing can include vertical walls (e.g., for attaching load cell mount(s)) and horizontal walls (e.g., for supporting one or more stages and/or mount plates).

Figure 1B:
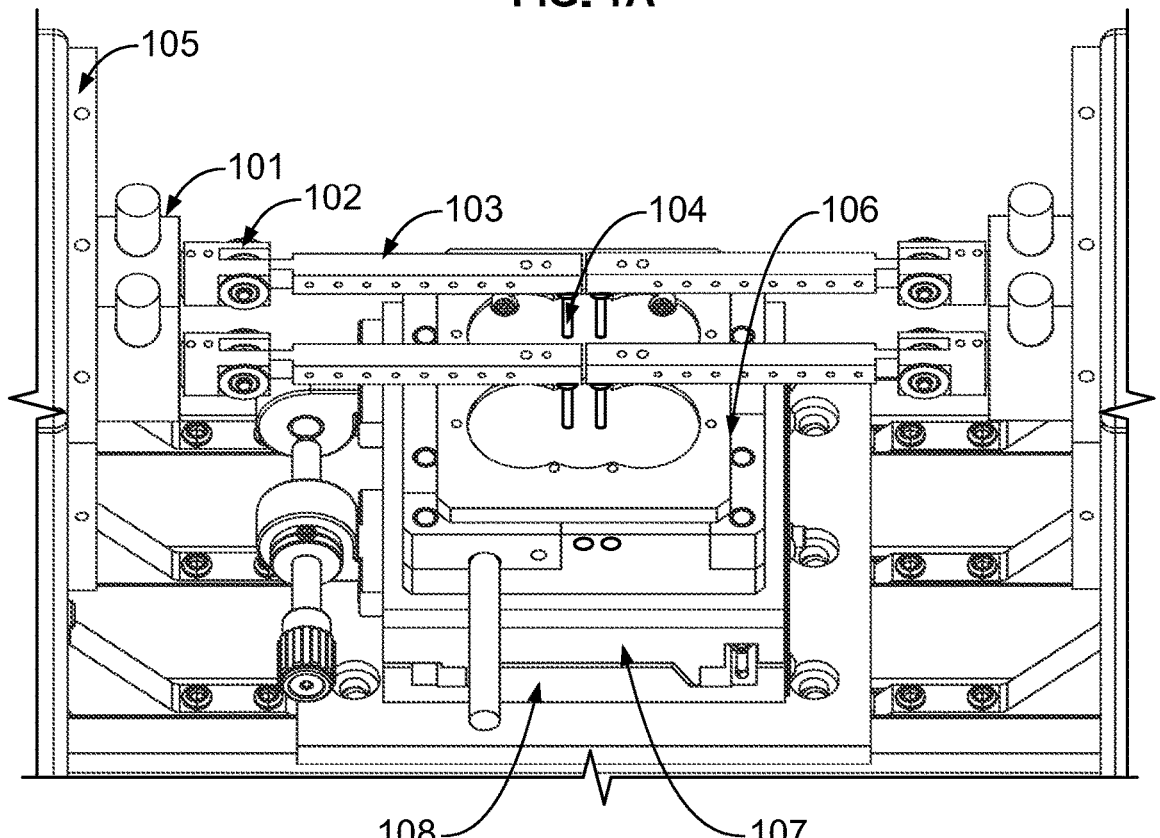
Figure 1C:
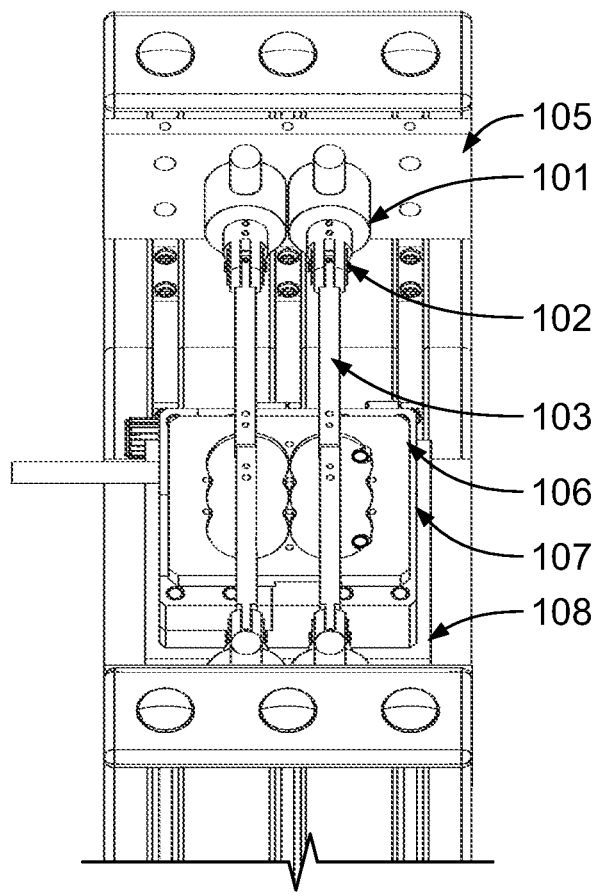

FIG. 1B shows various components for an exemplary system having a tester attached to a load cell mount 105 and in proximity to a mount plate 106, which in turn is supported by a positioning stage 107 and a motion stage 108. The exemplary tester includes a load cell 101 attached to the load cell mount 105, a joint 102 disposed between the load cell 101 and the load arm 103, and a ball holder 104 disposed at the distal end of the load arm 103. As seen in FIG. 1C, more than one load cell 101 can be attached to each load cell mount 105.

Figure 2A:
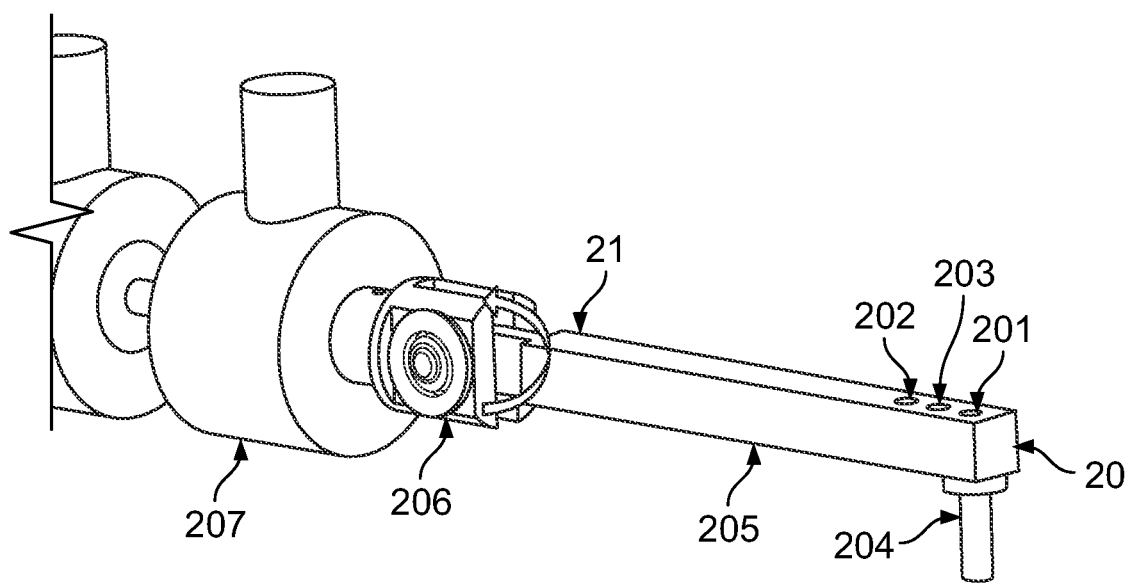
FIG. 2A-2B shows schematics of (A) an exemplary load arm with various attachment positions and (B) an exemplary load arm having a weight cup.

The tester can have any useful components to facilitate movement of the load arm and testing of the sample. FIG. 2A provides an exemplary load arm 205 with a rotating joint 206 that allows the arm to be moved in relation to a rigid, non-moving load cell 207 located at the distal end 21. Furthermore, the proximal end 20 of the load arm 205 can various attachment positions to facilitate attachment of one or more ball holders 204 or other components to apply a load to the sample surface. In one instance, the proximal end 20 can include a first attachment position 201 configured to provide a ball holder at a first location, a second attachment position 202 configured to provide a ball holder at a second location, and/or a load attachment position 203 configured to apply a load to the end of the load arm. The loading attachment position can be used to attach a deadweight load, a weight cup, and/or an electronic actuator load.

Figure 3A:
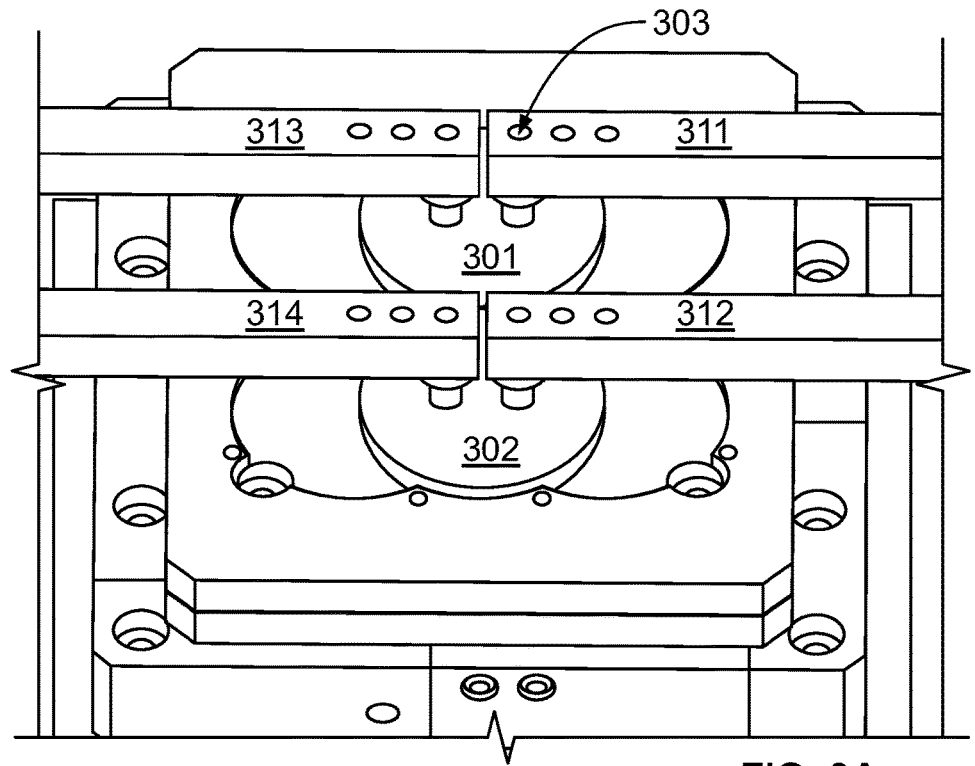
FIG. 3A-3B shows an exemplary system configured for testing two samples. Provided are (A) top view and (B) side view schematics.
Figure 3B:
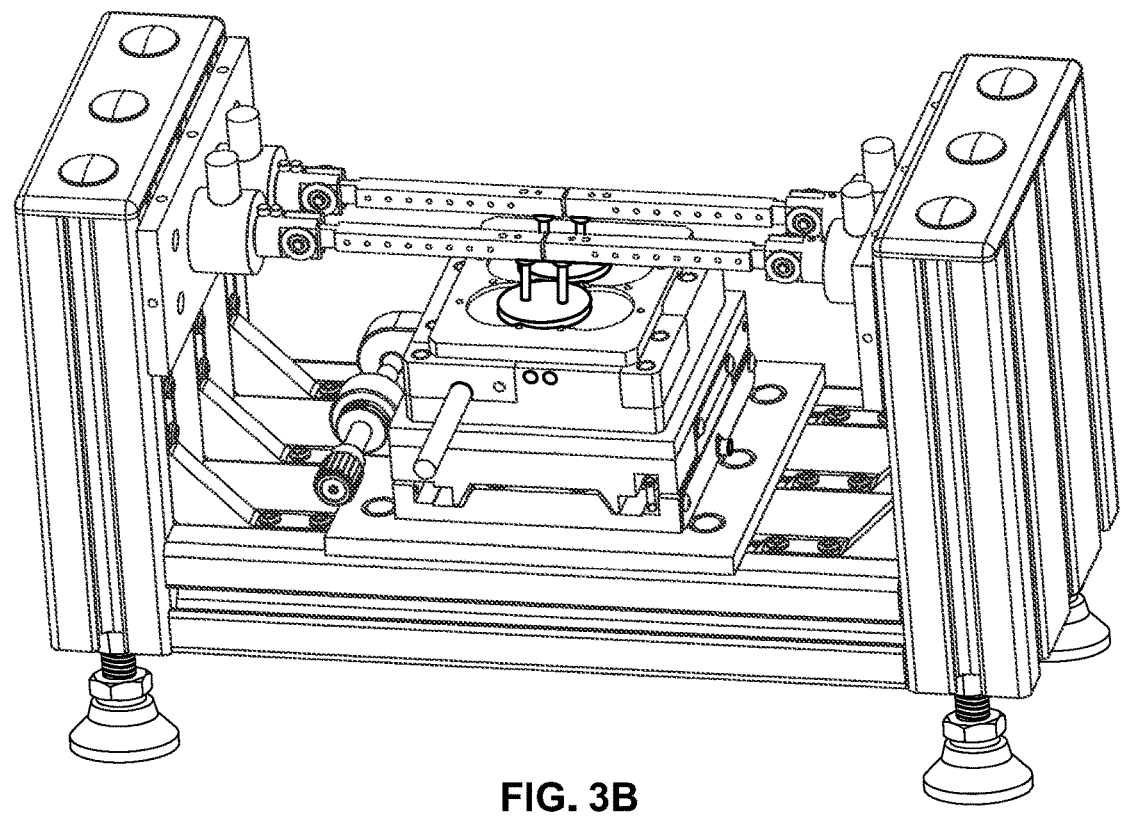
Figure 4A:
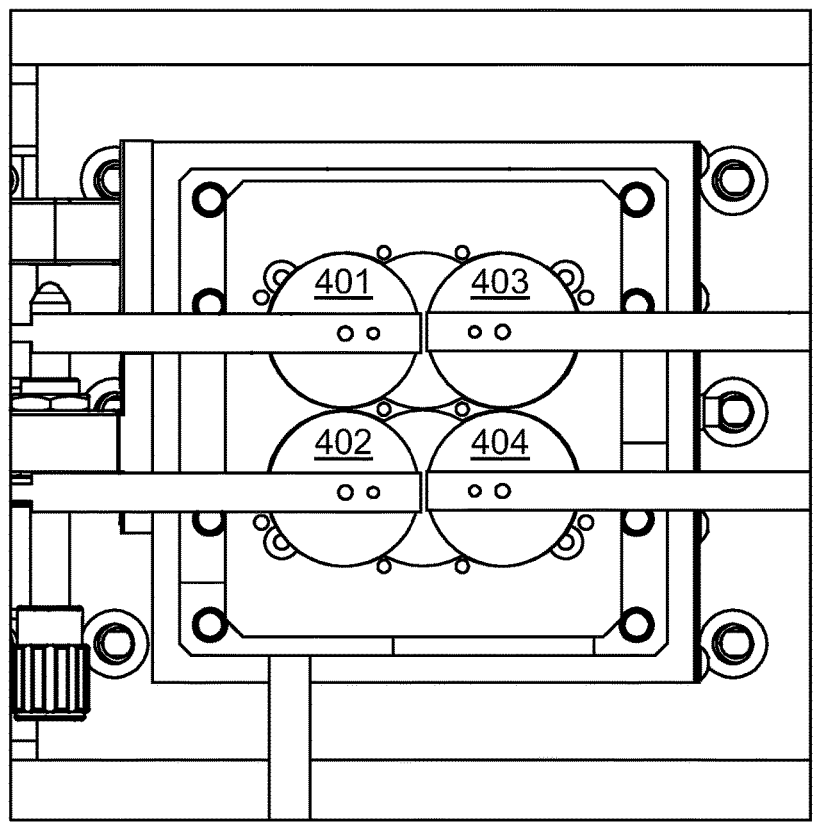
FIG. 4A-4B shows an exemplary system configured for testing four samples. Provided are (A) top view and (B) side view schematics.
Figure 4B:
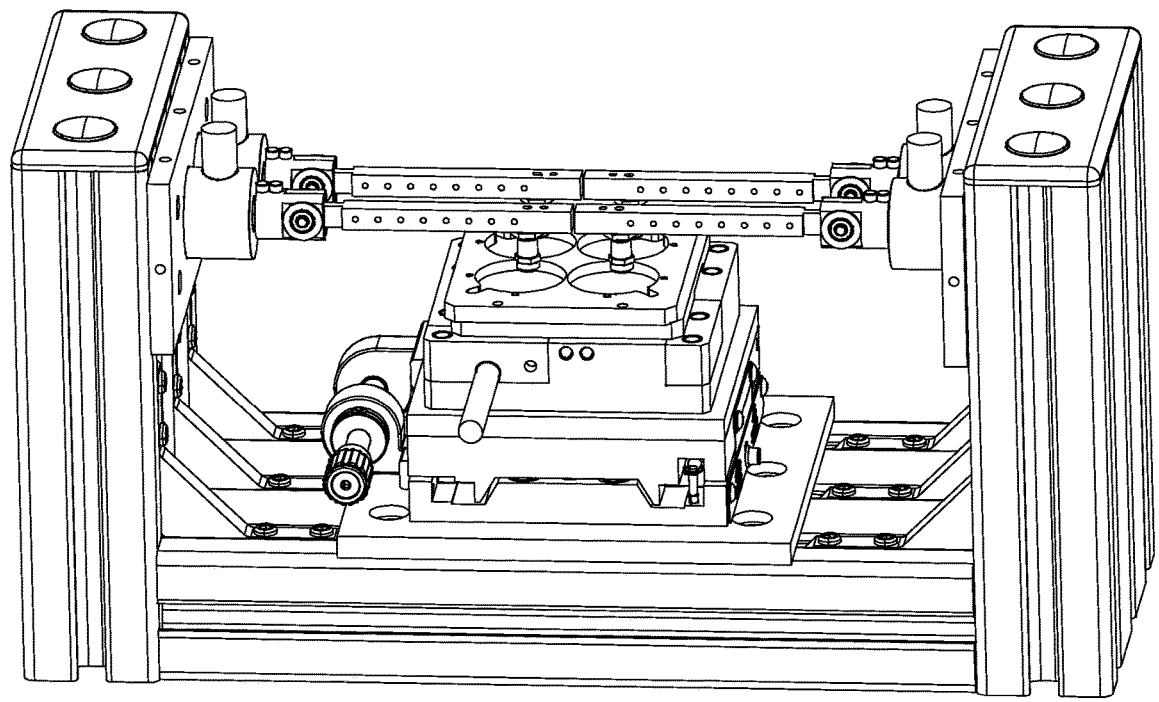

The location of the ball or pin holders can be configured to test samples in any useful mode. In one non-limiting embodiment, as seen in FIG. 3A-3B, a ball or pin holder is provided at the first position 303 of each load arm 311,312, 313,314, thereby providing four wear tracks on two samples 301,302 (e.g., two wear tracks on each sample). In another non-limiting embodiment, as seen in FIG. 4A-4B, a ball or pin holder is provided at the second position of each load arm, thereby providing four wear tracks on four samples 401,402 (e.g., one wear track on each sample).

The system can include one or more load actuators (e.g., electronic load actuators) or a plurality of load actuators. In one non-limiting instance, each load actuator is configured to apply a load to the ball or pin holder. In another instance, each load actuator is located in proximity to the distal end of the load arm. The system can include a frame configured to support the load actuator(s) and/or to provide the load actuator(s) in proximity to the distal end of the load arm. The frame can include, e.g., one or more vias to provide an electrical connection (e.g., a wire or cable) to the one or more load actuators (e.g., one or more electronic load actuators). The frame can be optionally attached to the housing.

Figure 2B:
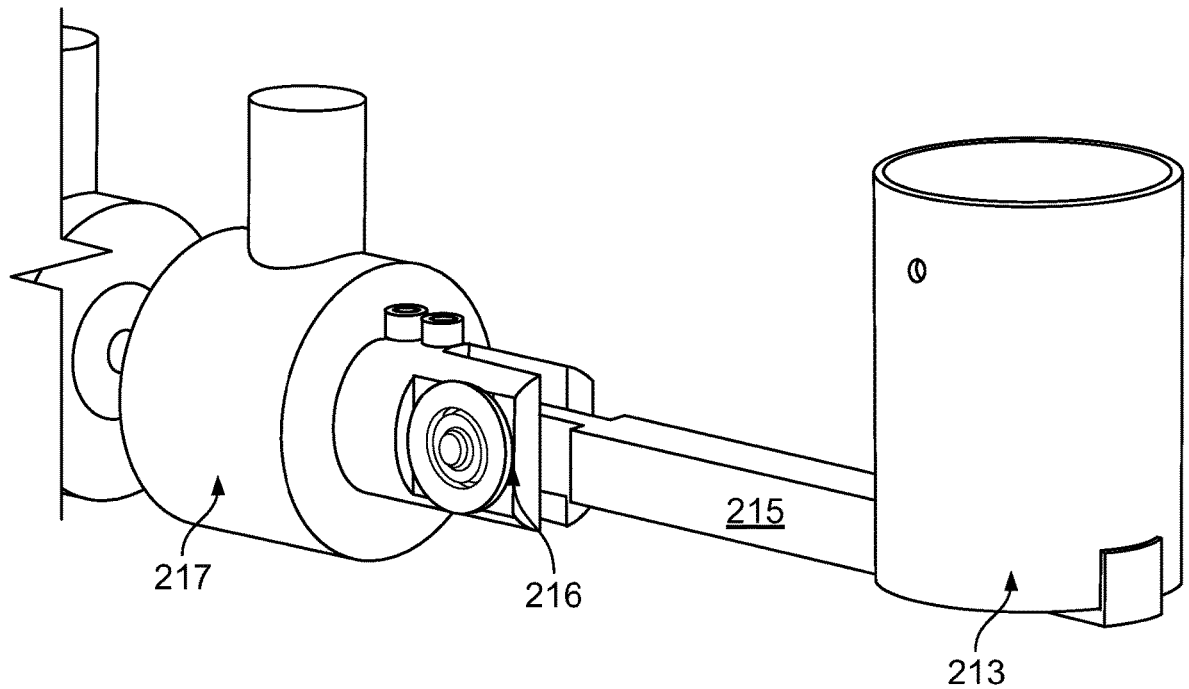
Figure 5:
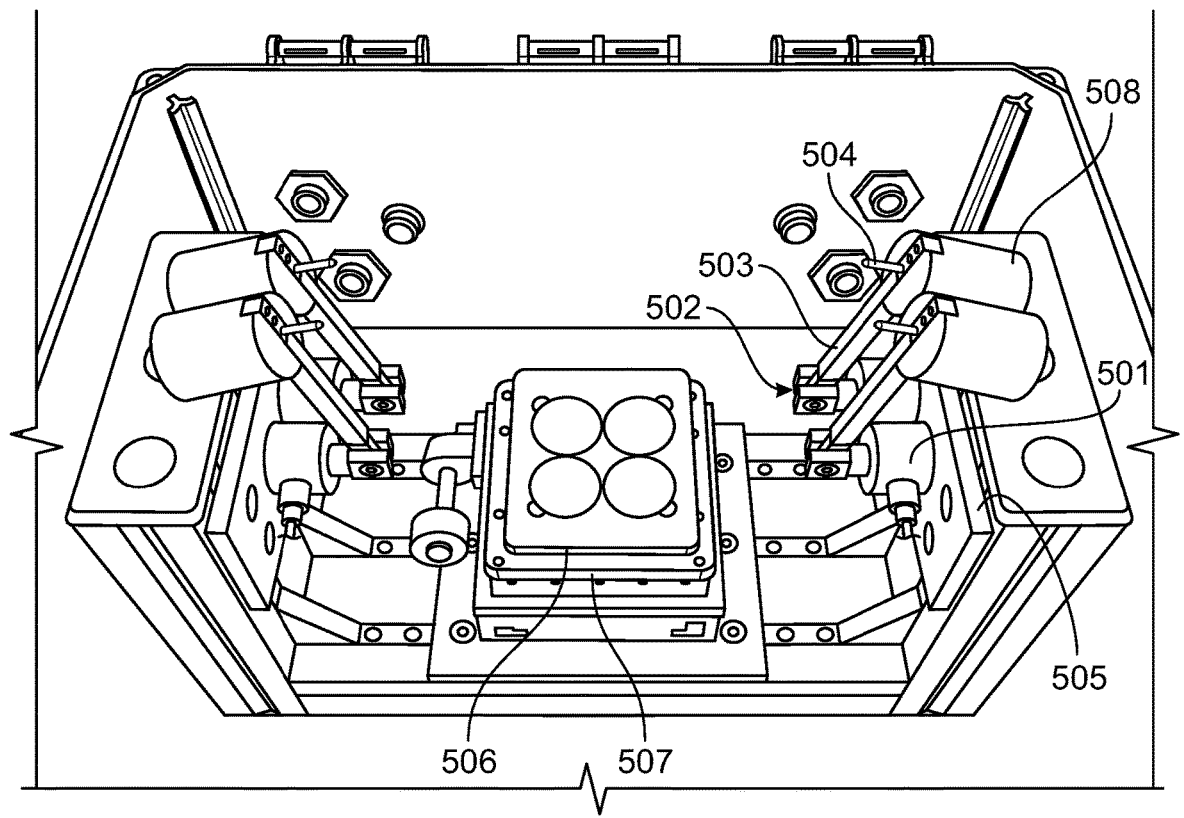
FIG. 5 shows a photograph of an exemplary system for wear testing.

As seen in FIG. 2B, the testing arm can include a load arm 215 with a joint 216 disposed between a load cell 217 and a weight cup 213 configured to hold one or more weights (e.g., ball bearings of particularized weight). FIG. 5 provides a photograph of an exemplary system having a weight cup. The system can include a plurality of testers, in which each tester includes a load cell 501 attached to a joint 502 disposed on the proximal end of the load arm 503, a ball or pin holder 504 and a weight cup 508 disposed on the distal end of the load arm 503, a load cell mount 505 attached to the load cell 501 and a housing of the system, a mount plate 506 including at least one sample holder in proximity to at least one load arm, and a stage (e.g., a motion stage 507) configured to position and/or move the mount plate.

Figure 6:
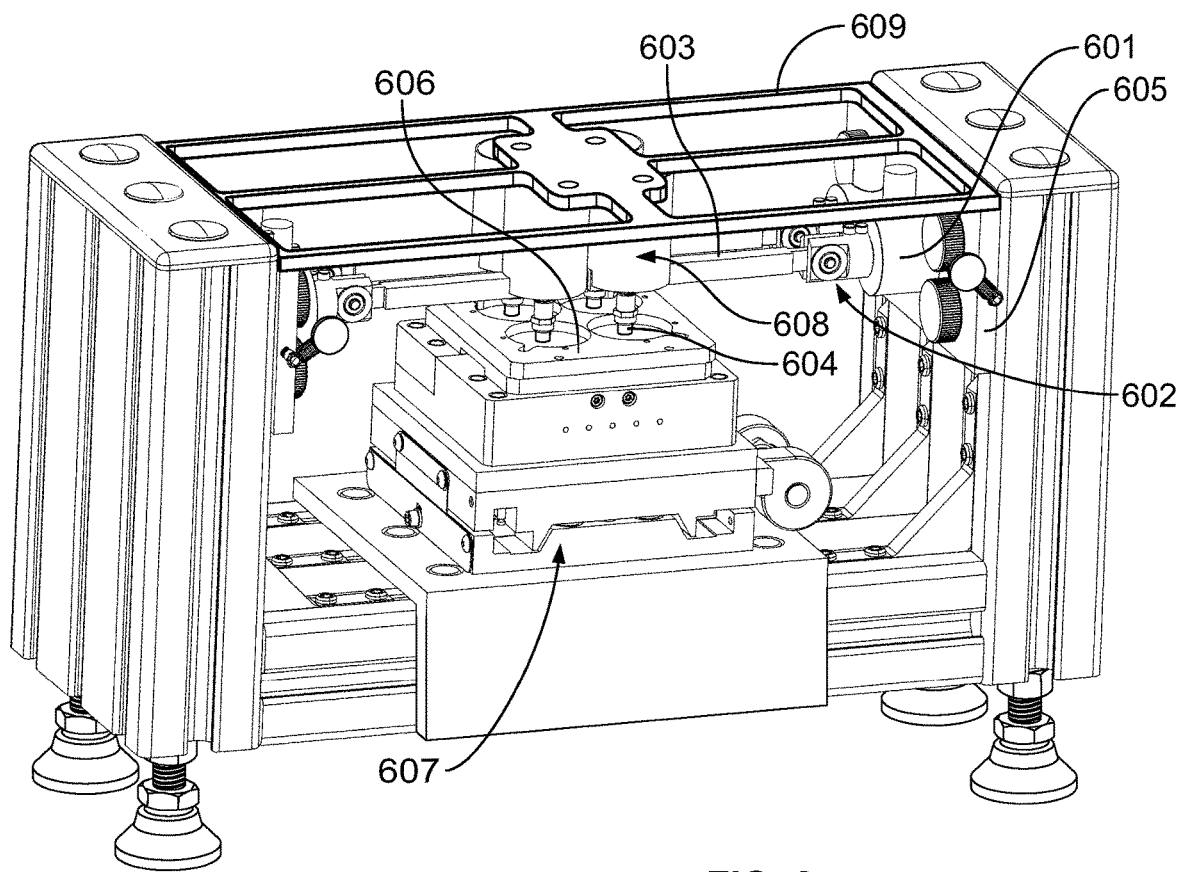
FIG. 6 shows an exemplary system including electronic load actuators 608 and a liquid testing cell 606.

As an alternative to weight-based loads, the system can include the use of one or more electronic load actuators to apply a load. FIG. 6 provides a schematic of an exemplary system having such electronic load actuators. The system can include a plurality of testers, in which each tester includes a load cell 601 attached to a joint 602 disposed on the proximal end of the load arm 603, a ball or pin holder 604 and an electronic load actuator 608 disposed on the distal end of the load arm 603, a load cell mount 605 attached to the load cell 601 and a housing of the system, an optional liquid testing cell 606 for use with a mount plate including at least one sample holder in proximity to at least one load arm, a stage (e.g., a motion stage 607) configured to position and/or move the mount plate, and a frame 609 configured to support the one or more electronic load actuators 608.

The system can also include one or more optical spectroscopy assembly configured to obtain optical measurements (e.g., Raman spectroscopy measurements, optical microscopy measurements, etc.). In one embodiment, the optical spectroscopy assembly is configured to transmit an optical signal to each sample holder. In another embodiment, each tester (e.g., on the distal end of each load arm) is coupled to an optical spectroscopy assembly.

The optical spectroscopy assembly can include any useful components, such as a fiber optic cable or an optical fiber (e.g., configured to provide, transmit, and/or receive an optical signal, such as from an optical source, e.g., a laser, and/or to a spectrometer, e.g., a Raman spectrometer), an objective assembly (e.g., configured to provide, transmit, receive, and/or focus an optical signal), a filter (e.g., a Raman filter, a dichroic filter, etc.), a lens (e.g., a half-ball lens), a collimator, a mirror, a focusing optic, an optical pump, a coupler, etc.

In one embodiment, the optical spectroscopy assembly includes a first optical fiber (e.g., a fiber optical cable) configured to provide an optical signal (e.g., and/or transmit an optical signal emitted from the half-ball lens); an objective assembly configured to focus the optical signal, thereby providing a focused optical signal (e.g., and/or transmit an optical signal emitted from the half-ball lens); a half-ball lens disposed within the ball or pin holder; and a second optical fiber configured to transmit the focused optical signal from the objective assembly to the half-ball lens. In some embodiments, the second optical fiber is further configured to receive the optical signal emitting from the half-ball lens. In other embodiments, the assembly includes a third optical fiber (e.g., a collection fiber) configured to collect the optical signal emitting from the half-ball lens.

Figure 7A:
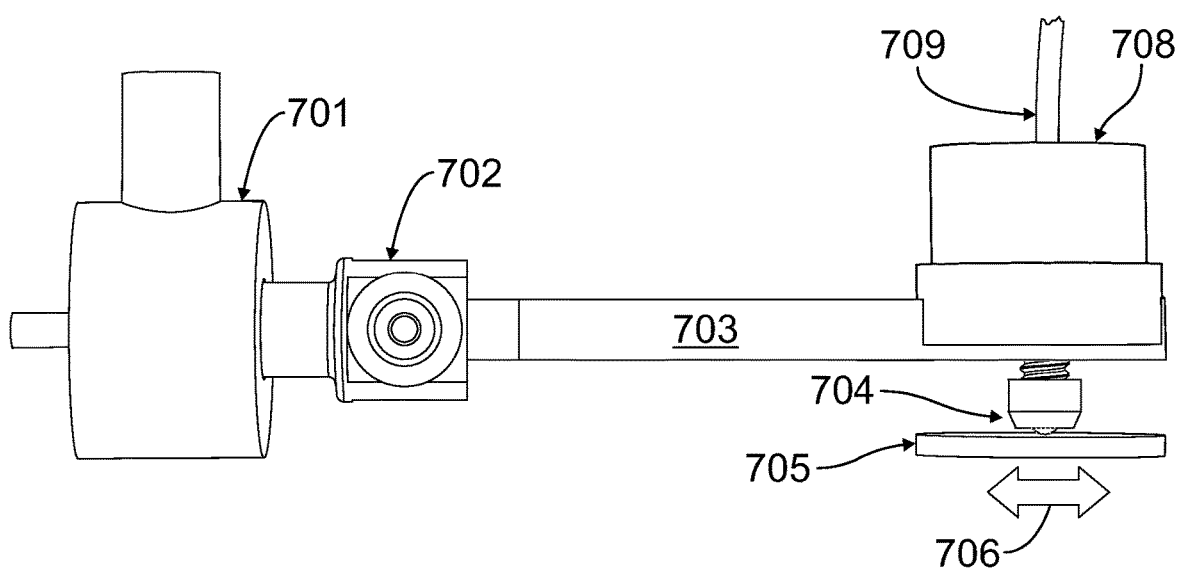
FIG. 7A-7D shows an exemplary system having an optical spectroscopy assembly (e.g., for Raman spectroscopy). Provided are (A) a side view and (B) a cross-sectional view of the exemplary system, (C) a detailed, cross-sectional view of the ball holder 707, and (D) a perspective view of an exemplary system having a frame 720.

FIG. 7A provides an exemplary optical spectroscopy assembly having a fiber optic cable 709 coupled to a load actuator 708 and configured to provide an optical signal to the ball or pin holder (e.g., and to the ball or pin within the holder) providing an applied load 704 to a sample 705 (e.g., configured to be moved 706, such as by use of a stage described herein). The optical spectroscopy assembly can be configured to transmit the optical sample to each sample holder (e.g., and to the sample within the sample holder). In one instance, the optical spectroscopy assembly is configured to be disposed on the distal end of a load arm 703, in which the load arm 703 is coupled to a load cell by a joint 702.

Figure 7B:
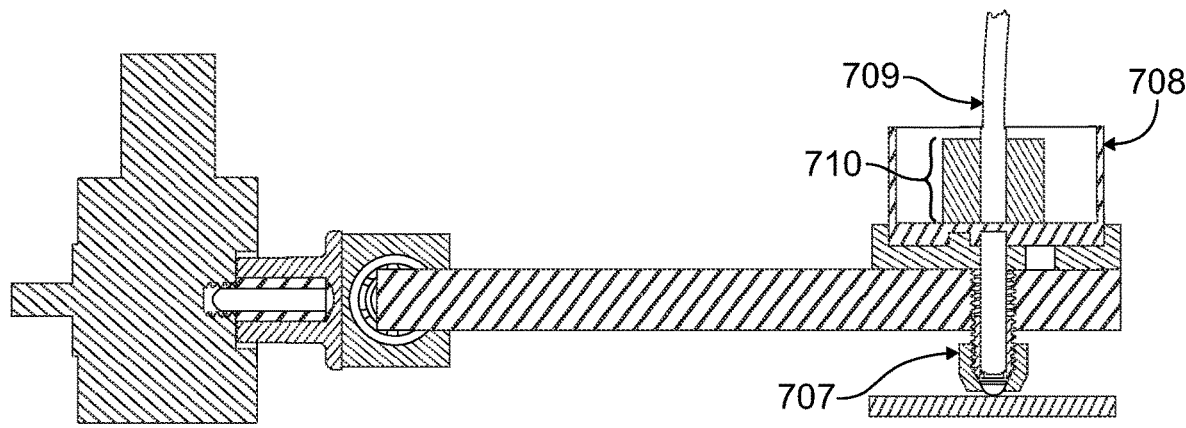

FIG. 7B provides a cross-sectional view of an exemplary optical spectroscopy assembly, in which the fiber optic cable 709 is inserted through an orifice disposed within the load actuator 708 and is coupled to an objective assembly 710 disposed within the load actuator. The objective assembly can include any useful components to receive an optical signal from the fiber optical cable and transmit the signal to the half-ball lens. Optionally, the objective assembly can be configured to provide a focused optical signal. Exemplary components include one or more optical connectors, lenses, and/or magnification objectives. As also seen in FIG. 7B, the objective assembly 709 is coupled to the ball holder 707. In use, an optical signal is transmitted from the fiber optic cable, through the objective assembly, and then to the ball holder. In some instances, the ball holder includes a lens in proximity to the sample surface, such that the optical signal is transmitted from the objective assembly to the lens, thereby transmitting the optical signal (e.g., the focused optical signal) in proximity to the sample surface.

Figure 7C:
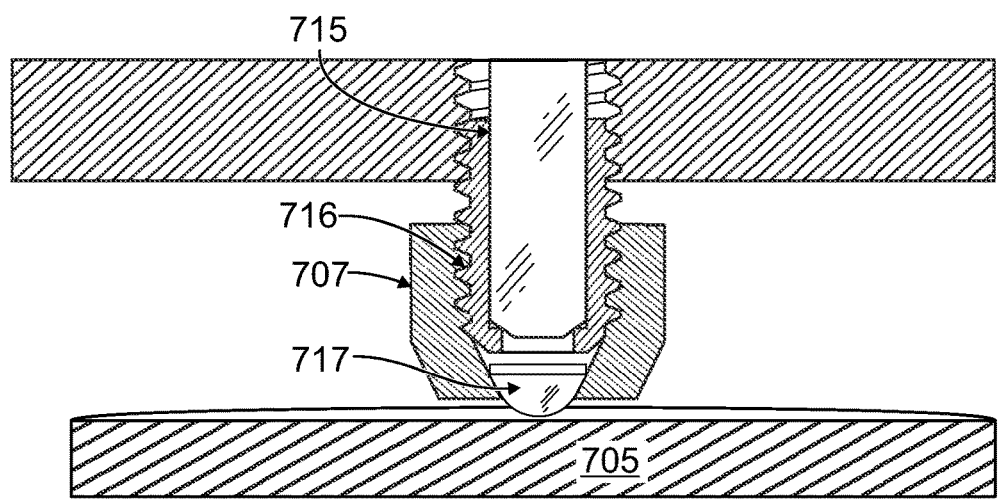

The optical signal from the objective assembly can be provided to the ball or pin holder in any useful manner. As seen in FIG. 7C, an optical fiber 715 is disposed between the objective assembly and the half-ball lens 717 disposed within the ball holder 707. Optionally, a connector can be employed to provide the distal end of an optical fiber 715 in proximity to the half-ball lens 717. The half-ball lens can perform two different functions, including providing a wear surface to abrade or rub against a sample surface, as well as providing an optical path from an external source (e.g., a laser) to the sample surface.

Figure 8A:
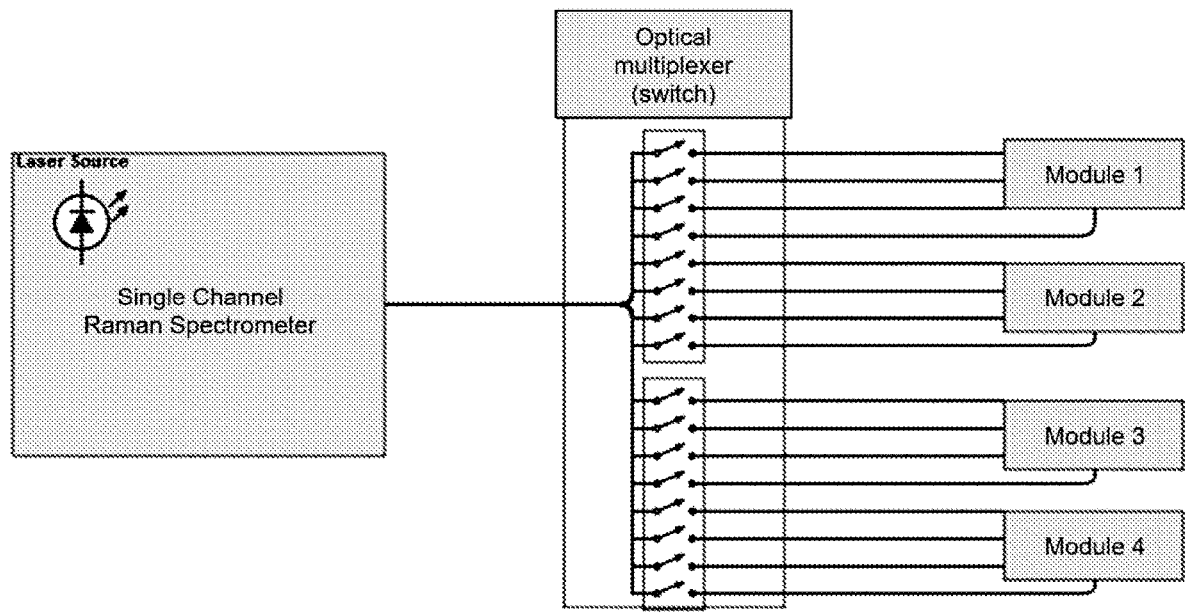
FIG. 8A-8B shows schematics of a spectrometer for use with an exemplary optical spectroscopy assembly. Provided are schematics for (A) single channel characterization and (B) multiple channel characterization.
Figure 8B:
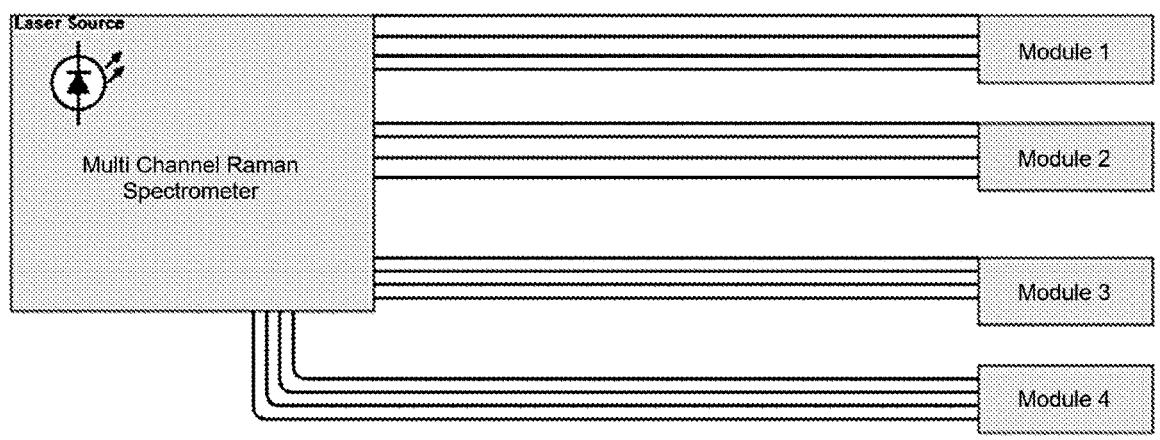

Furthermore, the optical spectroscopy assembly can include one or more components to transmit an optical signal from the sample surface to a detector, e.g., a camera, a spectrometer, a charge-coupled device, etc. In one instance, the transmitted optical signal travels from the half-ball lens and through the optical fiber, then the objective assembly, and finally the fiber optical cable before reaching the detector. The optical fibers and fiber optical cables can have any useful form, such as a multi-mode fiber, a single-mode fiber, or a bundle of fibers (e.g., a bundle of illumination and/or collection fibers). The transmitted optical signal can be provided to the detector in any useful manner. In one non-limiting instance, the detector is single channel spectrometer, and an optical multiplexer is configured to receive one or more signals from the optical spectroscopy assembly(ies) and transmit the optical signal(s) to the spectrometer (see, e.g., FIG. 8A). In yet another instance, the detector is a multiple channel spectrometer, and each optical signal from each optical spectroscopy assembly is transmitted to a single channel of the spectrometer (see, e.g., FIG. 8B).

Figure 7D:
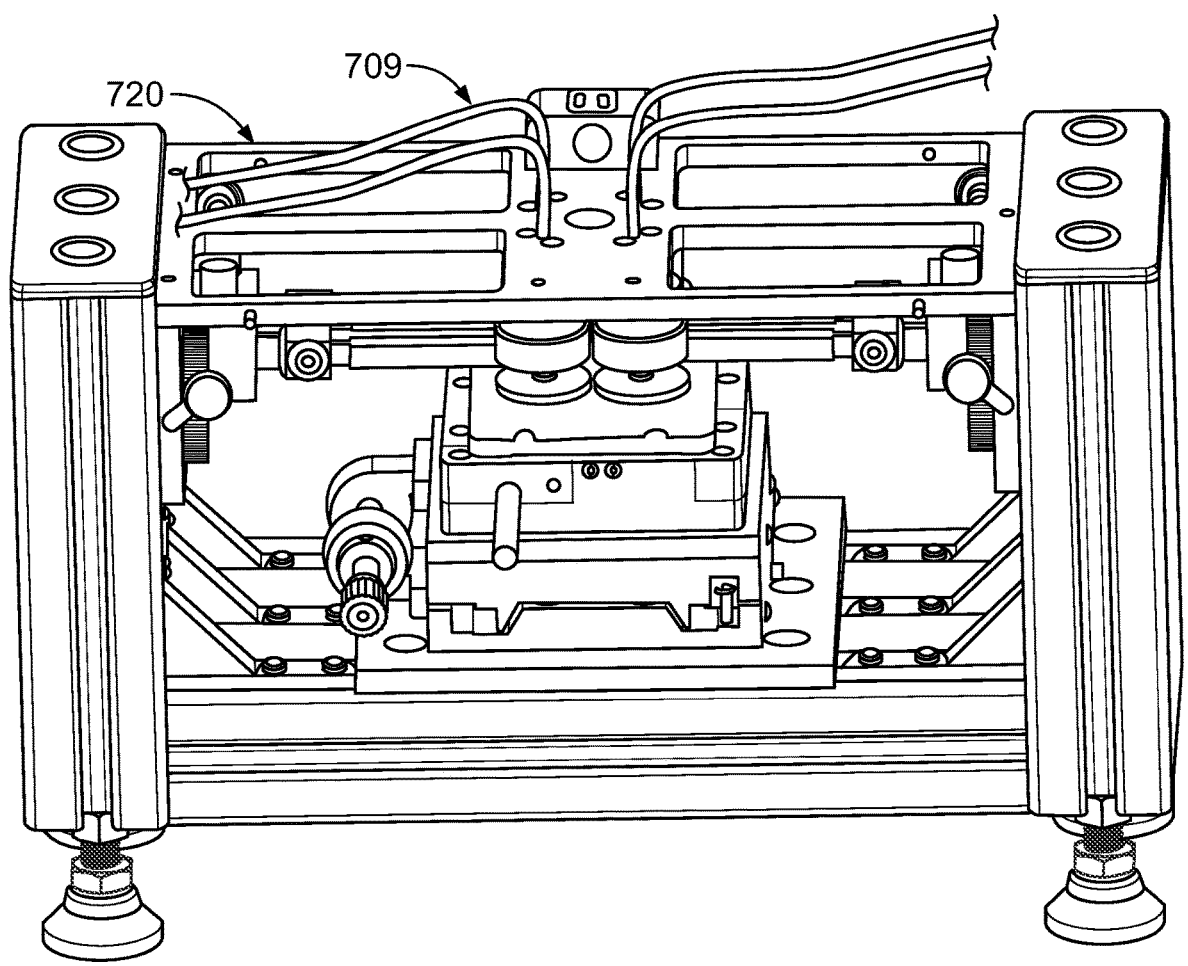

The system can include one or more components to support and/or enable the optical spectroscopy assembly. In one instance, the system includes a frame that is configured to provide at least one optical spectroscopy assembly in proximity to the distal end of each load arm. In another instance, the frame can include e.g., one or more vias to provide an optical connection (e.g., an optical fiber or cable) to the one or more optical spectroscopy assemblies. In yet another instance, the frame includes structural components to provide one or more load actuator(s) and one or more optical spectroscopy assemblies. In one non-limiting embodiment, the frame is configured to provide the load actuator(s) and the optical spectroscopy assembly(ies) in proximity to the distal end of a load arm. The frame can include, e.g., one or more vias to provide an electrical connection (e.g., a wire or cable) to the one or more load actuators (e.g., one or more electronic load actuators) and an optical connection (e.g., an optical fiber or cable) to the one or more optical spectroscopy assemblies. The frame can be optionally attached to the housing. As seen in FIG. 7D, the system can include a frame 720 including one or more vias to provide an optical connection by way of a fiber optic cable 709 coupled to the optical spectroscopy assembly or a component of the optical spectroscopy assembly (e.g., coupled to the objective assembly).

Methods for Manufacturing Ball Holders

The present invention also relates, in part, to high throughput methods for manufacturing ball holders. Each wear test requires a new surface (e.g., provided by a ball or a pin) to form the wear track. A high throughput method for wear testing would benefit from a complementary method of manufacturing ball holders in a high throughput manner.

Figure 9A:
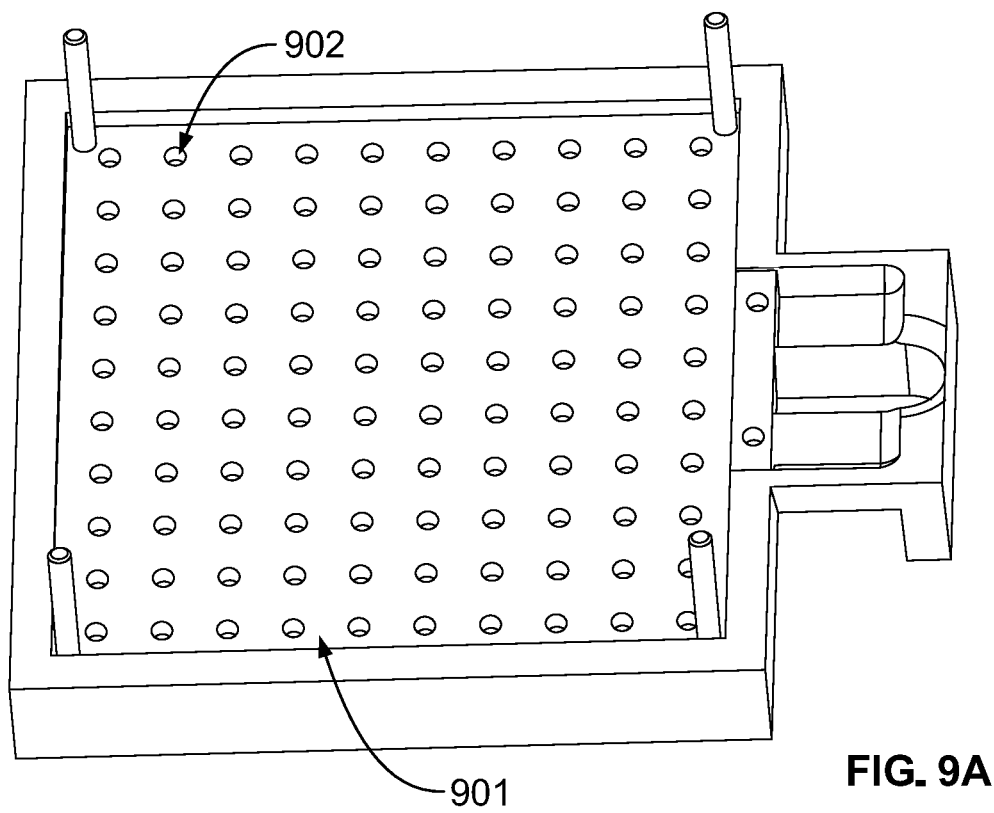
FIG. 9A-9E shows an exemplary method for manufacturing ball holders. Provided are schematics for (A) the fixture 901 configured to accommodate a plurality of balls, as well as use of the fixture to (B) remove excess balls, (C) insert ball holders, and (D) align ball holders having balls. Also provided is (E) a schematic of an exemplary ball holder 903 including a ball 910.
Figure 9B:
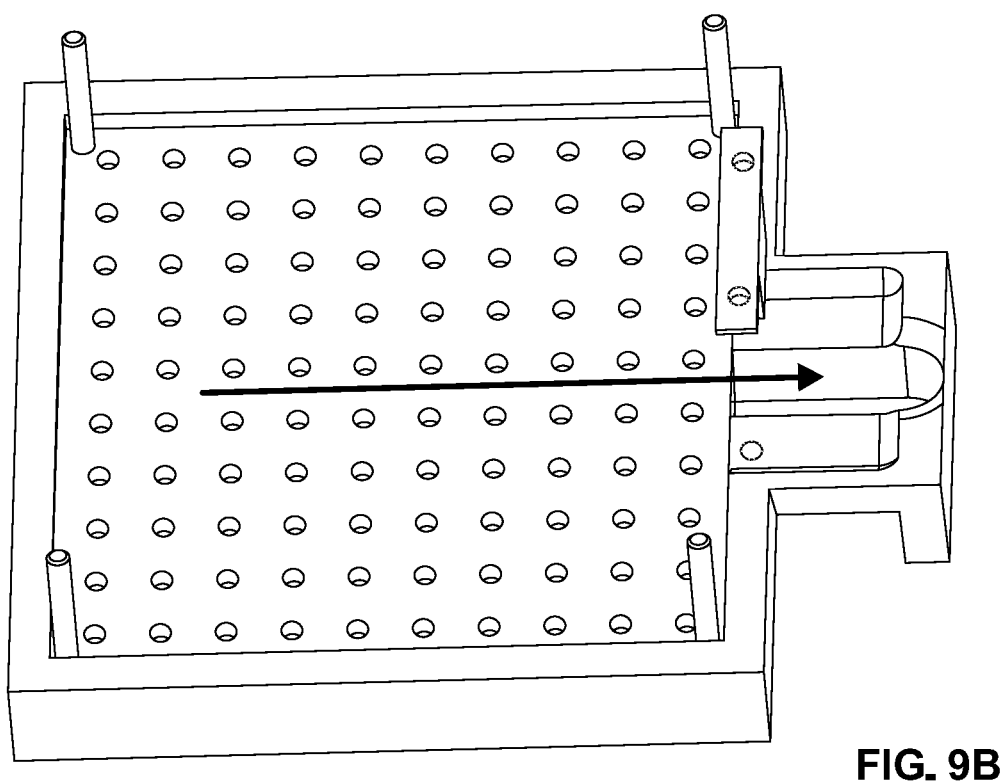
Figure 9C:
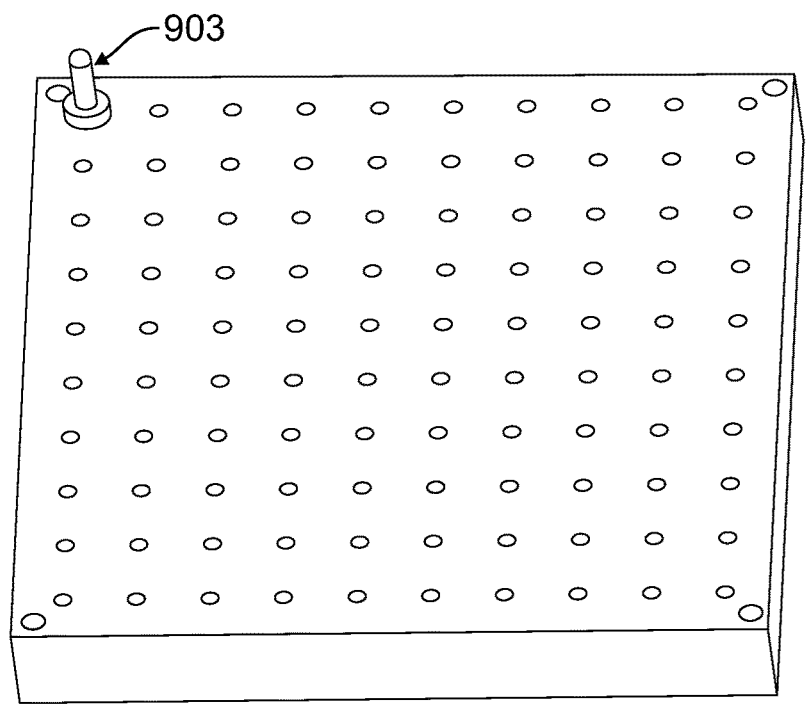
Figure 9D:
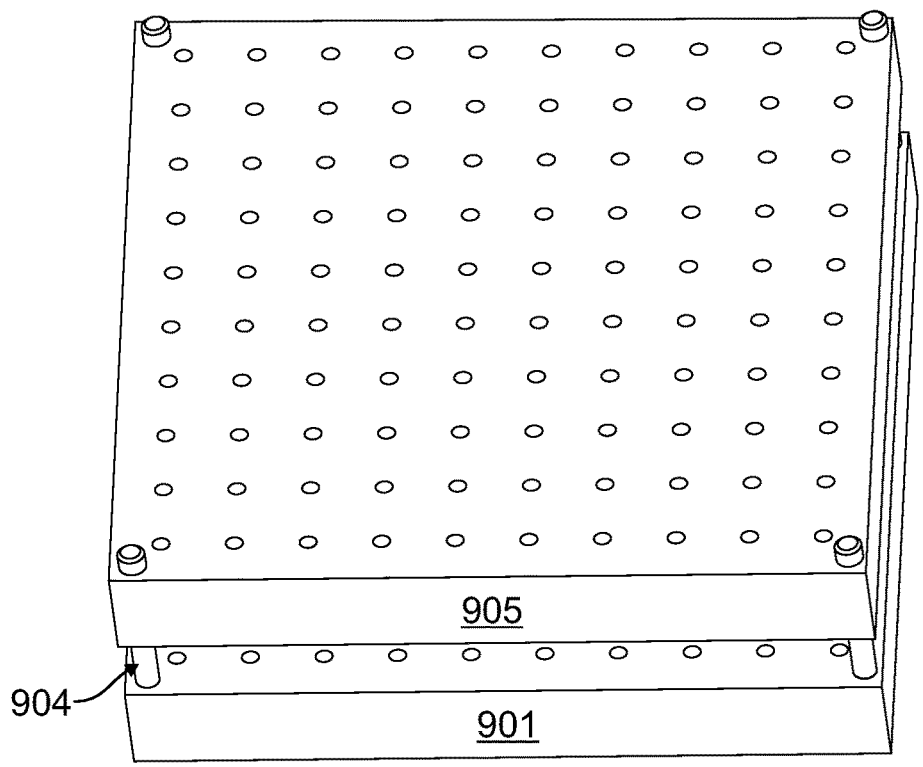
Figure 9E:
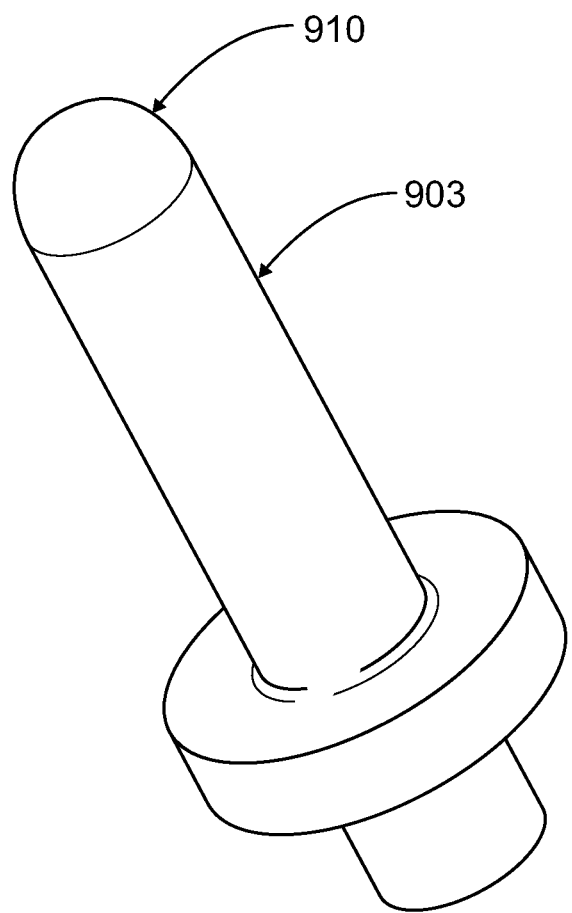

FIG. 9A-9E provides an exemplary method for high throughput manufacturing of ball holders. In part, a fixture 901 is employed to align a plurality of balls simultaneously, in which the fixture includes a fixed array of holes 902 and a single ball is placed within a single hole 902 (FIG. 9A). Excess balls are removed (arrow, FIG. 9B) by tilting the fixture towards the outlet. Then, a base is employed to align a plurality of ball holders simultaneously, in which the fixture includes a fixed array of holes and a single ball holder 903 is placed within a single hole (FIG. 9C). Finally, the base 905 is aligned with the fixture 901 by using an alignment peg 904, thereby providing a single ball holder in proximity to each ball (FIG. 9D). An adhesive is employed to adhere the ball to the ball holder, thereby providing a completed ball holder 903 including a ball 910 (FIG. 9E).

Systems for Torque Sensing

The present invention also relates to a system for torque sensing, which includes a first reference encoder, a measurement encoder, and a flexure (e.g., a mechanical spring) disposed between the encoders. Disposed on a common axis is a drive input shaft, the flexure, and the drive output shaft. By applying a torque to the drive input shaft, the flexure responds by an angular deflection, which in turn results in a change in rotation of the drive output shaft. These responses can be detected by the encoders, in which the reference encoder is fixed to the drive input shaft and the measurement encoder is coupled to the drive output shaft. In use, an encoder is a transducer that converts motion (e.g., rotational motion) into an electrical signal. Various characteristics of the motion can be detected, such as direction, speed, position, etc.

The flexure can include any useful structure configured to provide an angular deflection upon application of torque to the drive input shaft. In some embodiments, the angular deflection results in a phase difference between the first output signal of the reference encoder and the second output signal of the measurement encoder. In one embodiment, the flexure is a spring (e.g., a machined spring) or a coil.

Figure 11A:
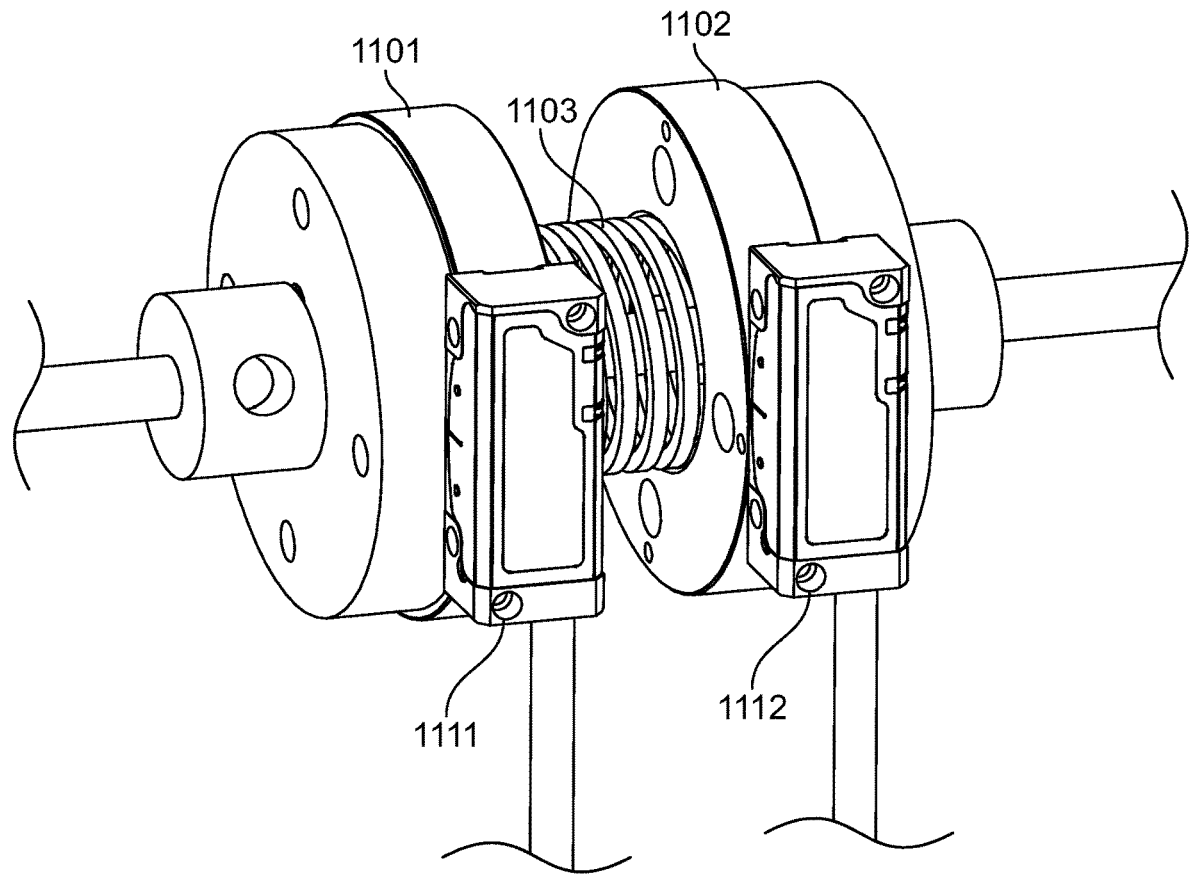
FIG. 11A-11D shows an exemplary torque sensor and methods for measuring torque. Provided are schematics of (A) an exemplary torque sensor, (B) exemplary output signals for an encoder, (C) exemplary output signals for a reference encoder and a measurement encoder, in which torque is not applied, and (D) exemplary output signals for a reference encoder and a measurement encoder, in which torque is applied to the input drive shaft.

FIG. 11A provides an exemplary system including a reference encoder 1101, a measurement encoder 1102, and a flexure 1103 disposed between the encoders. Output signals from the encoders can be detected in any useful manner, e.g., by use of one or more optical readers 1111,1112 coupled to each encoder. The output signals from an encoder (e.g., a quadrature encoder, a sin/cos encoder, a linear encoder, a rotary encoder, a sinusoidal encoder, a pulse train encoder, an incremental encoder, an absolute encoder, or combinations thereof) can be employed to provide any useful measurement (e.g., position, speed, and/or direction, including direct, indirect, and/or incremental measurements). Encoders can be employed with any other useful component(s) (e.g., one or more readers, comparators, interpolators, converters (e.g., analog-to-digital converters (ADCs)), pulse counters, processors, etc.

Figure 11B:
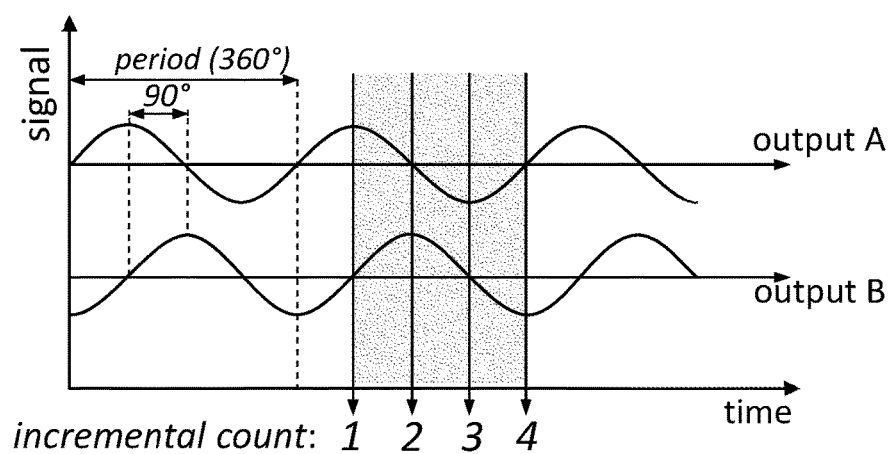

Output signals can be employed to determine the specific torque values. In one non-limiting instance, the output signal of the reference encoder and the output signal of the measurement encoder are compared, and a difference in signal (e.g., voltage peak-to-peak signal, phase, position, direction, etc.) is correlated to a specific torque value. FIG. 11B provides exemplary output signals for an incremental sine/cosine (sin/cos) encoder having two phase shifted output signals: output A and output B, in which the phase shift is 90°. These output signals can be determined for each signal period (360° electrical), in which an incremental count can be determined during a signal period.

Figure 11C:
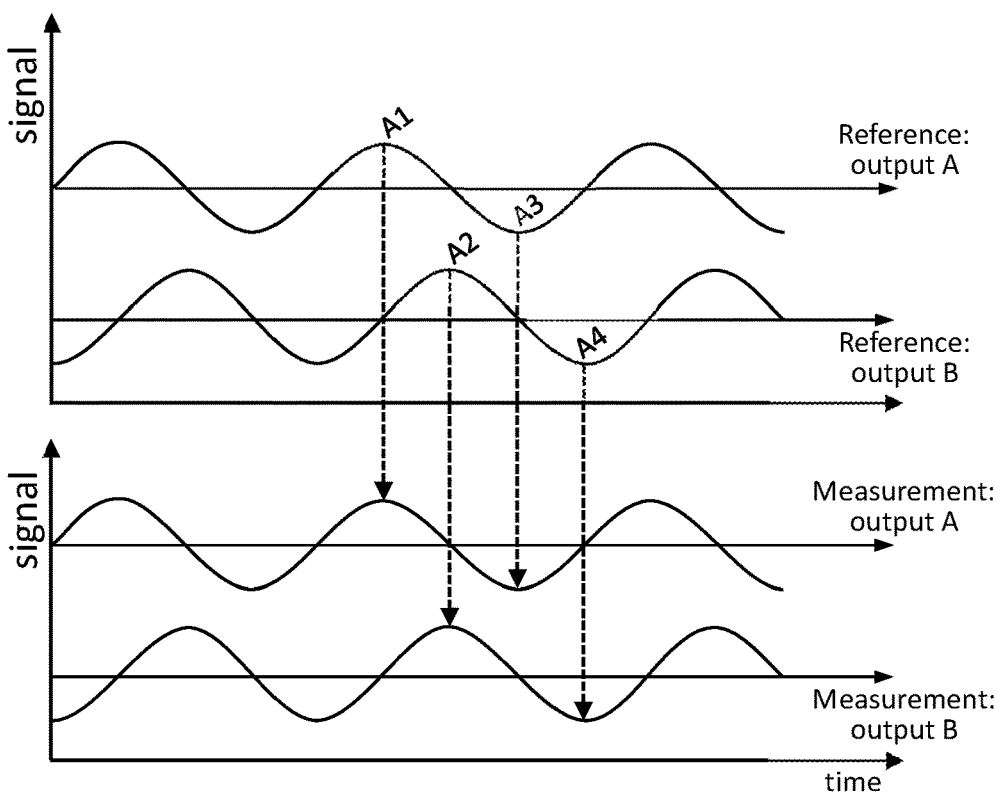

Each encoder can provide one or more output signals. In particular, the reference encoder (e.g., a reference rotary encoder) and the measurement encoder (e.g., a measurement rotary encoder) each provide one or more output signals, and a comparison of the output signals provide a relative change in torque. As seen in FIG. 11C, each of the reference and measurement encoders provide phase-shifted output signals A and B. When torque is not applied to the drive input shaft, a comparison of the output signals at particular incremental counts (e.g., A1, A2, A3, and/or A4) provides no difference between the output signal from the reference encoder (e.g., output A and/or output B from the reference encoder) and an output signal from the measurement encoder (e.g., output A and/or output B from the measurement encoder). When torque is applied as in FIG. 11D, a phase shift (e.g., one or more of $\Delta p1$, $\Delta p2$, $\Delta p3$, and/or $\Delta p4$) is measured between an output signal from the reference encoder and from the measurement encoder at the relevant incremental count (e.g., A1, A2, A3, and/or A4).

The system for measuring torque (e.g., a torque sensor) can include any useful component. In one non-limiting instance, the system includes a flexure disposed around an internal shaft; a drive input shaft coupled to the flexure (e.g., a first end of the flexure); a drive output shaft coupled to the flexure (e.g., a second end of the flexure); a reference encoder coupled to the drive input shaft and/or the first end of the flexure (e.g., where the reference encoder is configured to provide a first output signal); and a measurement encoder coupled to the drive output shaft and/or the second end of the flexure (e.g., where the reference encoder is configured to provide a second output signal. In another non-limiting instance, the system further includes one or more optical readers configured to transmit and/or receive an output signal from one or more encoders (e.g., a first optical reader coupled to the reference encoder, where the first optical reader is configured to receive and/or transmit the first output signal; and/or a second optical reader coupled to the measurement encoder, where the second optical reader is configured to receive and/or transmit the second output signal).

Figure 12A:
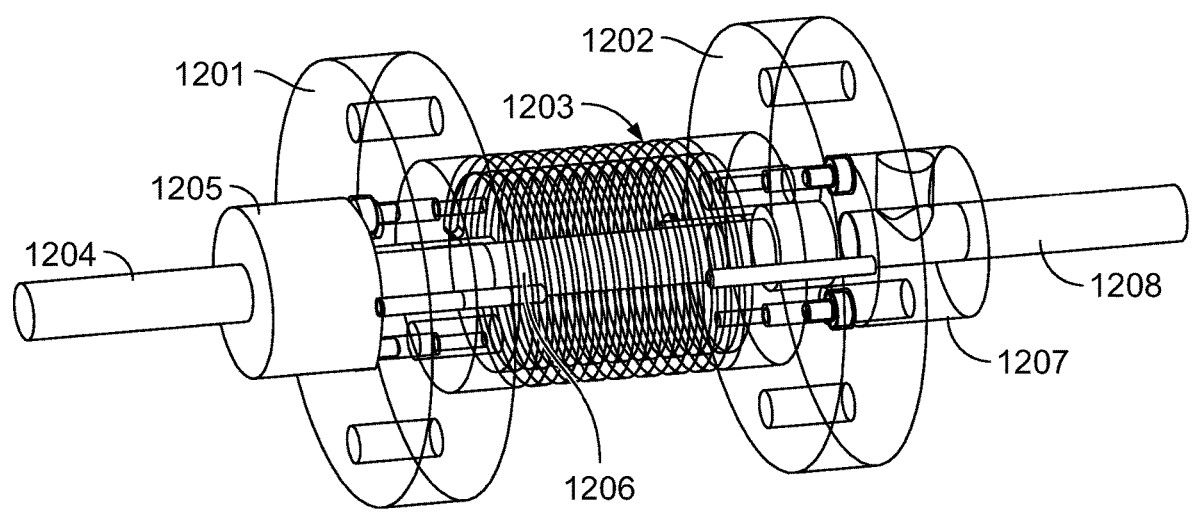
FIG. 12A-12B shows an exemplary torque sensor. Provided are (A) perspective view and (B) close-up view schematics.
Figure 12B:
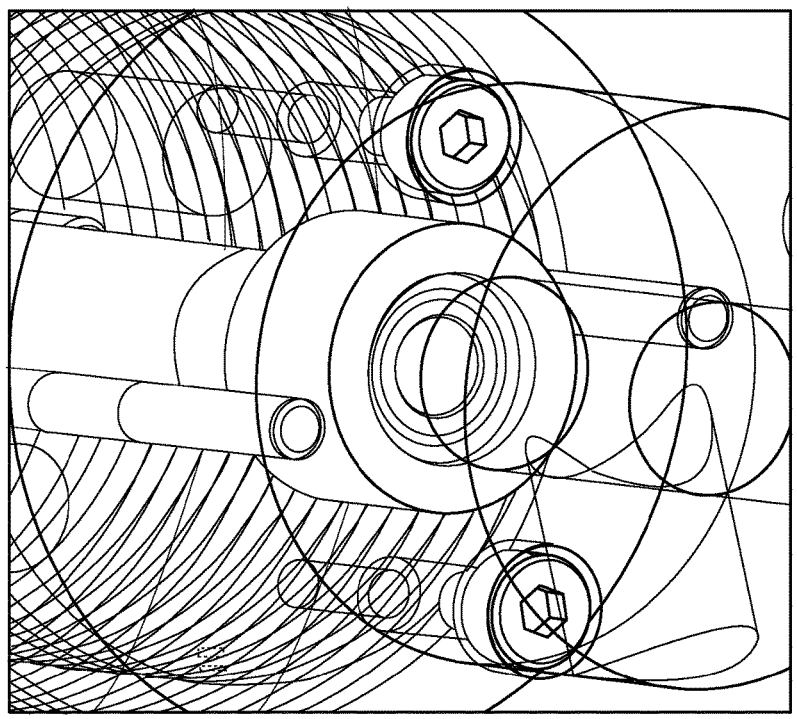

The drive input shaft, internal shaft, and drive output shaft can be aligned along a common axis. In some embodiments, one or more bushings and/or bearings are disposed between the drive input shaft and the internal shaft and/or between the internal shaft and the drive output shaft. In one non-limiting instance, the reference encoder is fixed to the drive input shaft. In another non-limiting instance, the measurement encoder is coupled to an end (e.g., a second end) of the flexure and/or an end of the drive input shaft. In yet other instances, the reference encoder and/or the measurement encoder are rotatably disposed about the common axis. FIG. 12A provides an exemplary system for torque sensing, which includes a drive input shaft 1204 (e.g., coupled to a first end of the flexure).; a reference encoder 1201 (e.g., coupled to the drive input shaft 1204); a first bushing 1205 disposed between the drive input shaft 1204 and the reference encoder 1201; a flexure 1203 disposed around an internal shaft 1206 and disposed between the reference encoder 1202 and the measurement encoder 1202; a measurement encoder 1202 (e.g., coupled to the drive output shaft 1208); a second bushing 1207 disposed between the measurement encoder 1202 and the drive output shaft 1208; and a drive output shaft 1208 (e.g., coupled to a second end of the flexure). FIG. 12B provides a detailed view of the interface including the measurement encoder, second bushing, and drive output shaft.

EXAMPLES

Example 1: Low Cost, High Throughput Friction and Wear Tester

We have developed a tester to enable multiple simultaneous tests to be conducted in a high throughput manner. High throughput nature of the tester could enable statistical studies of material coatings with respect to their friction performance.

Current state-of-the-art generally relies on single sample testing. Various testing standards require a particular testing speed to obtain performance results, such that increasing the testing speed is not a viable strategy to increase throughput. Thus, one method of high throughput testing involves developing a system to test multiple samples in a simultaneous manner.

We have developed a prototype system that allows four samples (or two samples) to be tested (see, FIG. 5). Four load cells, load arms, deadweight loads, and quick-change ball holders are used to conduct four simultaneous friction tests on the four (or two) samples. By keeping the cost of the systems low, multiple copies can be constructed to achieve even higher throughput. Since each system is independent of its copies, they can be subjected to different testing conditions so that one can investigate an entire test matrix in one simple test.

The system can be used to investigate any useful aspect of friction/wear coatings, e.g., deposition and chemical optimization, speed dependence, reliability, uniformity of coating, friction/wear behavior, and/or statistical studies that can rely on analyzing a large set of test results. Additional uses for such systems include, e.g., studies of many contacts under identical conditions to develop statistical distributions of friction and wear behavior; parallel tests on many samples (e.g., of different materials, or different sections on samples formed from the same material) under defined experimental conditions (e.g., identical or varying contact conditions) to screen materials for a candidate application; and/or parallel tests on the same material but under different environment and loading conditions, e.g., to rapidly assess the performance envelope of the material under a range of conditions.

Figure 10A:
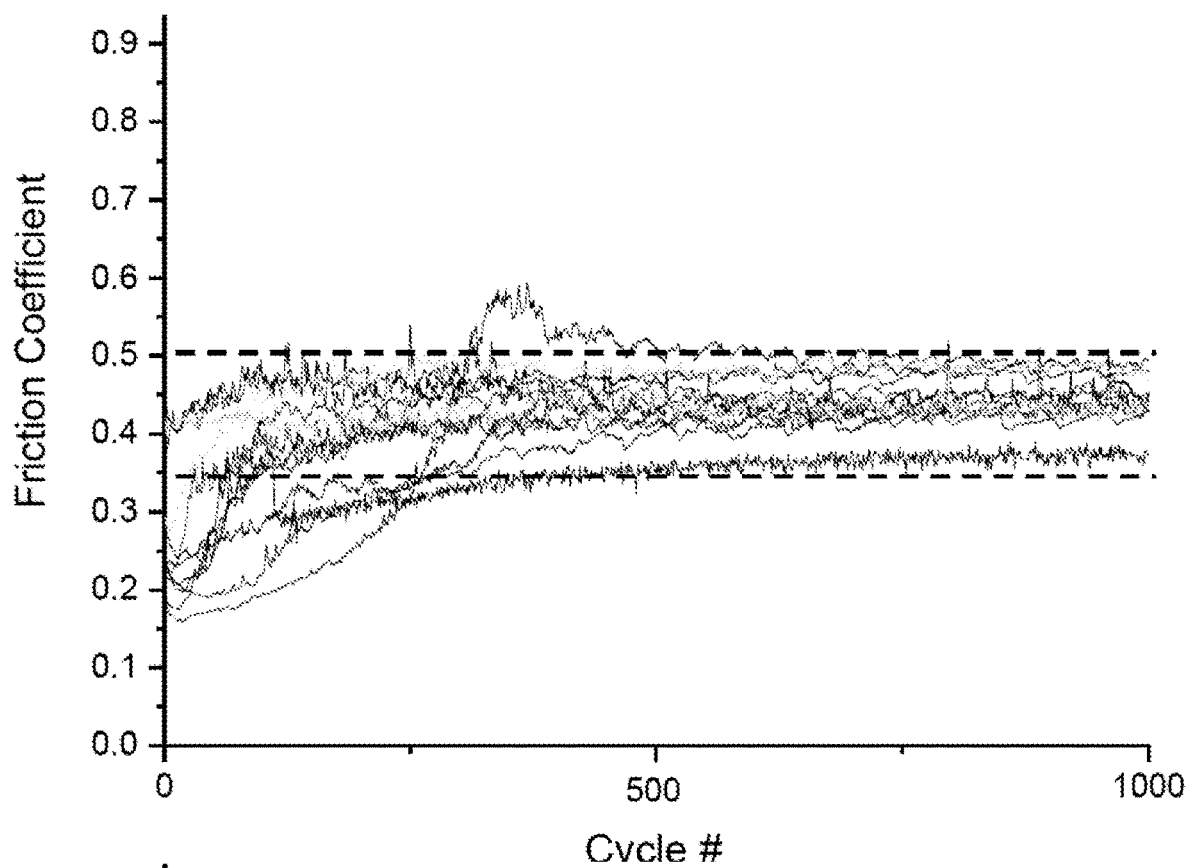
FIG. 10A-10B provides wear data obtained with (A) a commercial tribometer for 12 samples over a course of about 15 hours and (B) an exemplary high-throughput wear tester for 25 samples over a course of about 2 hours. Samples include TiCN on steel.
Figure 10B:
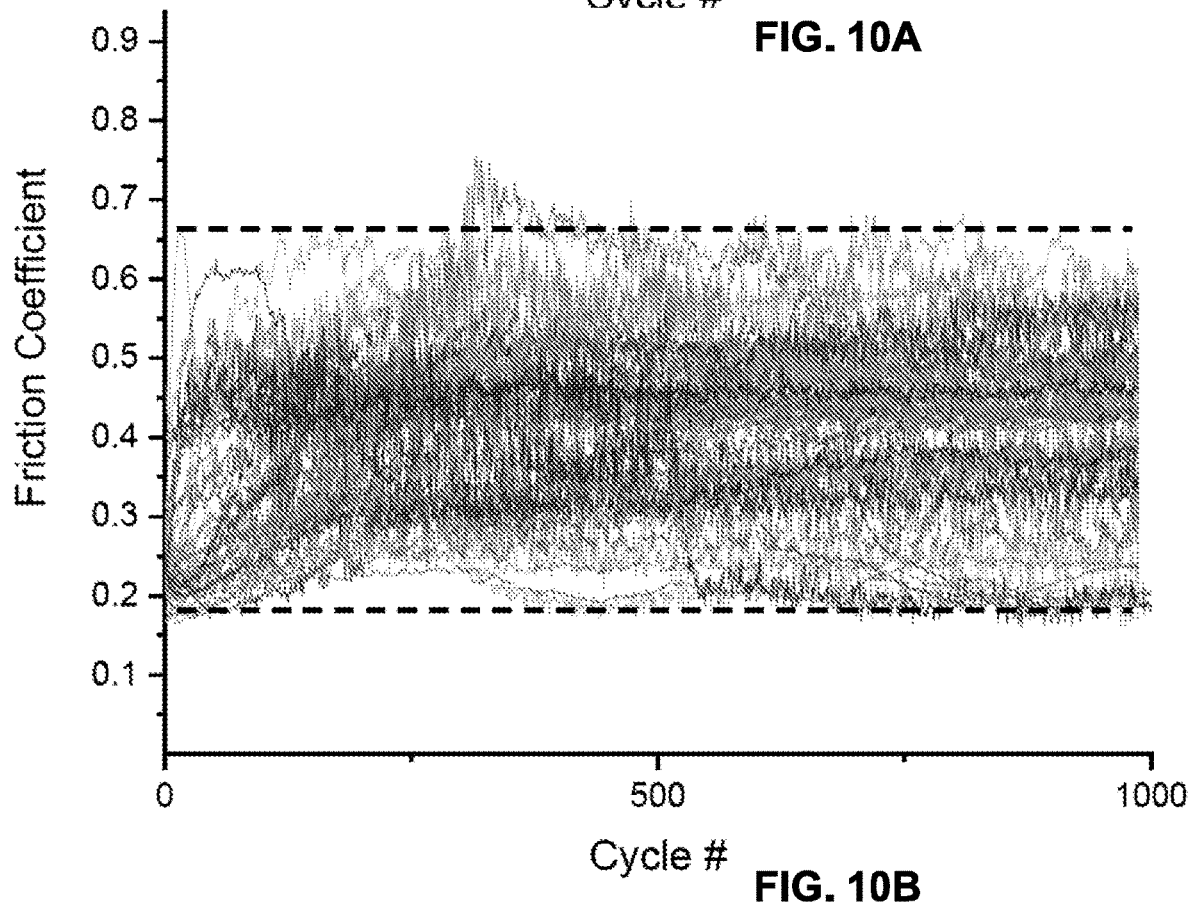

The system can be employed to collect and analyze data collected in a high throughput manner (e.g., of from about 50 kHz or greater of data acquisition per load cell) (see, e.g., FIG. 10A-10B). A software platform can be configured to provide real-time or post-testing analysis (e.g., in any useful format, such as Labview), as well as to display results (e.g., an average friction coefficient with standard deviation per cycle, minimum and maximum friction coefficient for a set or cycle). Another option will allow for direct export of raw data for additional studies (e.g., friction mapping).

In one non-limiting embodiment, the system employs a stage to provide a desired track length (±2.5 mm) at a desired speed (e.g., 250 mm/s). By using electronic and/or physical loading (e.g., as described herein), any useful normal force (e.g., of from about 10 mN to about 1 N) and/or friction force (e.g., of from about 10 mM to about 1N) can be applied. Any useful number of samples (e.g., 2, 3, 4, 5, 6, 7, 8, 9, 10, 12, 14, 16, 18, 20, etc.) can be tested simultaneously, and the mount plate can be configured to provide any useful number of sample holders (e.g., 2, 3, 4, 5, 6, 7, 8, 9, 10, 12, 14, 16, 18, 20, etc. sample holders, including one sample holder for each sample). By employing an environmental enclosure (e.g., as described herein), environmental conditions (e.g., humidity, temperature, air composition, air pressure, vacuum, ultrahigh vacuum, etc.) can be controlled.

Any number of tracks and samples can be employed (e.g., four tracks on four sample coupons (or one track on each sample coupon) or four tracks on two sample coupons (or a plurality of tracks on each sample coupon)). Additional details are described herein.

Example 2: Loading Methods for Applying Force

Various loading methods can be employed on the loading arm. In one non-limiting instance, electronic loading is used by providing an electronic actuator. As seen in FIG. 6, each arm can include an independently controlled electromagnetic voice coil actuator. The actuator is used to apply a force to oppose or assist the force of gravity in order to apply a load on the ball or pin holder and sample.

In another non-limiting instance, physical loading is used by providing a weight cup (see, e.g., FIG. 2B and FIG. 5). Predetermined weights (e.g., ball bearings) can be added to the weight cup, thereby increasing the applied force. Alternatively, such weights can be removed from the weight cup to provide a corresponding reduction in applied force.

Example 3: Environmental Monitoring and/or Control During Testing

The system can include an enclosure to enable testing of coatings in a controlled environment (e.g., air composition (e.g., nitrogen, argon, oxygen, etc.), humidity (e.g., of from about 0 to 60% relative humidity), temperature, etc.). The enclosure can have one or more sensors to measure environmental conditions. Such control may be desired in testing samples that are sensitive to environmental exposure. The enclosure can allow for purging with a protective environment (such as inert gases) and for converting a dry source to a humid source for achieving a desired humidity setpoint (e.g., such as by use of a bubbler housing). Since all environmental enclosures are independent of each other, the user can expose all copies to different environments without having to run separate tests.

Furthermore, samples can be tested under a desired liquid by using a liquid testing cell configured to attach to the top side of a mount plate (see, e.g., FIG. 6). The liquid testing cell can be manufactured from any useful material (e.g., a polymer such as polytetrafluoroethylene or other chemical resistant material) to allow each sample to be submerged/tested in a different fluid. For a set of four testing modules, this could provide sixteen different fluids to be tested simultaneously. Each liquid testing cell can include a chamber configured to be disposed above a sample holder, and each chamber can include a liquid sampling location to facilitate providing and testing the fluid within each chamber.

Example 4: In Situ Raman Spectroscopy

Any system herein can be further configured to allow for Raman characterization. In one embodiment, in situ multichannel Raman characterization can be conducted on each sample during testing. In some embodiments, characterization is enabled by using a multichannel Raman spectrometer and an optical multiplexer to enable in situ measurements via a fiber optic/micro objective assembly that is integrated into the friction head assembly and coupled to the measurement surface using a specially designed optical ball holder. The optical ball holder can use a spherical half-ball lens to serve as both the friction counter-body and the optical lens.

In one embodiment, the optical spectroscopy assembly includes an integrated fiber optic/objective that enables an optical signal (e.g., a laser signal) to be focused through an optical hemispherical ball lens to the surface of the material of interest (see, e.g., FIG. 7A-7C). During a friction test, this ball lens rubs against the surface of interest and causes morphological and chemical changes. The Raman measurement will enable a direct characterization of the evolution of the surface during the friction test.

Each pin or ball holder can be associated with an optical spectroscopy assembly. For instance, if a system employs 16 testers (each including a ball holder), then the system can be configured to receive 16 channels of simultaneous Raman measurements (e.g., Raman shift and vibrational mode analysis). Such Raman data can be spatially mapped to the position on the friction test and overlay friction coefficient. Such mapping of high throughput data could allow for various studies, including analysis of thousands of samples (e.g., composition, morphology and friction data) in a rapid manner, understanding of process variations on final product characteristics, real-time analysis and testing of coating quality.

Any useful components can be employed. As seen in FIG. 7A-7C, the optical spectroscopy assembly can include a rigid-mounted load cell 701 to resolve friction forces, a fiber optic cable 709 (e.g., 2 mm) to provide an optical signal, a motion stage to move the sample, a load actuator 708 (e.g., an electronic loading permanent magnet), an objective assembly 710 disposed within the load actuator (e.g., a Raman fiber optic objective assembly, <25 mm long, <3.0 mm diameter), and a ball holder 707 configured to hold a half-ball lens 717. As seen in FIG. 7D, the system can optionally include a frame 720 to ensure that the fiber optic cable 709 does not affect electronic loading. Such an optical spectroscopy assembly can be employed for Raman shift microscopy (e.g., to determine in situ characterization of surface chemistry, surface chemistry/temporal maps) and/or for optical microscopy of surface (e.g., to obtain in situ videos of wear surface evolution).

Optical data can be collected in any useful manner. In one instance, data are collected using single channel characterization, in which data are collected from each channel individually (see, FIG. 8A). An optical switch (e.g., an optical multiplexer) can be employed to select any of the testers for characterization. An automated test sequence could allow characterization of all of the testers individually at particularized intervals. In another instance, data are collected using multiple channel characterization, in which data are collected from each channel simultaneously (see, FIG. 8B). Such collection can provide high data fidelity.

Example 5: Manufacturing of Ball Holders

Also provided herein are methods for high throughput ball holder manufacturing, which can be useful for high throughput wear testing in which the ball has to be changed for every test. An exemplary method includes pouring balls into a fixture 901 and tilting or rotating the fixture to move balls over every hole (FIG. 9A); removing excess balls to storage to provide one ball in each hole (FIG. 9B); screwing ball holder into a base plate 905 (FIG. 9C) and applying an adhesive to a top surface to each ball holder (e.g., Crystalbond™512); and inverting the base over the fixture, placing the aligned holes in the base on the alignment pegs (FIG. 9D), and curing the adhesive (e.g., by use of heat). After curing, the ball holder 903 having the ball 910 can be removed from the base (FIG. 9E).

Example 6: Non-Contact, Frictionless, High Resolution Torque Sensor

The present invention also relates to a frictionless torque sensor design that minimizes measurement impact on system dynamics while providing highest resolution possible for low magnitude torque measurements. In one non-limiting embodiment, as seen in FIG. 11A, two rotary, non-contact encoders 1101,1102 are coupled together using a compliant angular flexure 1103. In one embodiment, the flexure is a spring designed to provide deflection that is highly linearized and one-dimensional. In another non-limiting embodiment, a reference encoder is fixed to the drive input shaft.

As torque is applied to the input shaft, the angular flexure allows one of the encoders to slightly lag behind a reference encoder that is mechanically fixed to the drive input shaft. This lag is the result of a torsional force being applied to the drive input shaft, which causes the angular flexure to deflect. Thus, when torque is applied to input shaft, torsional forces are transmitted through a low stiffness, machined spring to the output shaft. The low stiffness will cause the measurement encoder to lag behind reference encoder.

Comparison of the analog signals being emitted from both optical readers 1111,1112 (from the reference encoder and the measurement encoder) will reflect the angular deflection or lag. This angular deflection can be resolved at high resolution, while enabling simultaneous measurements such as speed, velocity, and shaft position. Since this measurement is performed using encoders (which have large numbers of signal counts per revolution), a torque measurement can be resolved for every position measurement.

The entire moving frame can be suspended using frictionless air bearings and/or low friction bearing-bushing combinations (e.g., an ultra-low friction bearing-bushing combination having both rotary and linear degrees of freedom)(see, e.g., bushings 1205,1207 in FIG. 12A-12B). These air bearings can provide support for motion while being frictionless.

Resolution of torque measurements can be further optimized. For instance, using interpolation, encoders can resolve fractions of arcseconds in angular displacements (equivalent to tens of nanometers in linear systems), thus allowing for extremely fine measurements of torque. By increasing the numbers of encoder pulses acquired during rotation of the sensor, the system could potentially resolve torque variations that are position dependent. The number of encoder pulses could also be refined to yield discretized angular torque measurements (e.g., specific torque values measured at points along rotation, rather than a single value based on sampling interval). Since encoders can resolve infinite angular displacements, it could be used to resolve both large and tiny torque values. Furthermore, encoders can provide incremental or absolute position and speed measurements, this allowing such torque measurements to be feasible for characterizing large motors that can typically suffer from low resolution torque measurements based on motor power losses.

Figure 11D:
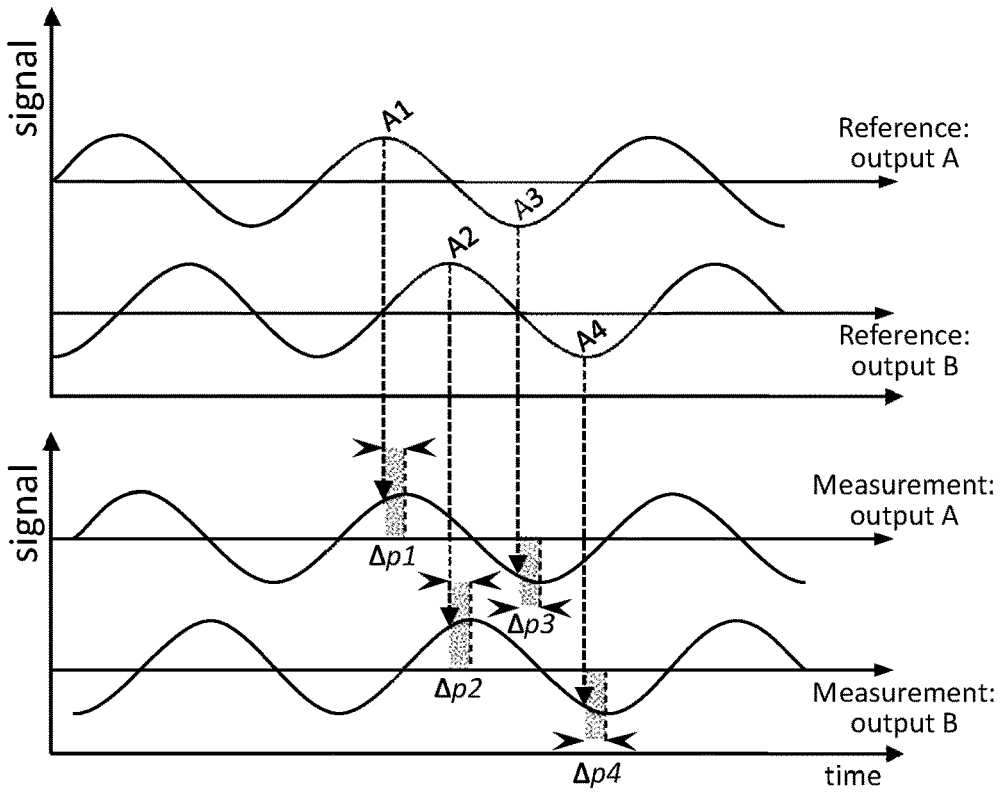

Output signals from encoders can be analyzed in any useful manner. FIG. 11B provides exemplary encoder signals (output A and output B), in which basic signal analysis of sinusoidal behavior can determine speed and position. By comparing output signals from reference and measurement encoders, perfect peak-to-peak alignment would indicate that torque is not applied (FIG. 11C). In contrast, if a peak shift $\Delta p n$ at incremental count n is observed for each output signal of the encoders, then it would indicate an application of torque (FIG. 11D).

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A system comprising:
   a flexure disposed around an internal shaft, wherein the flexure comprises a first end and a second end;
   a drive input shaft coupled to the first end of the flexure;
   a drive output shaft coupled to the second end of the flexure;
   a reference encoder coupled to the drive input shaft, wherein the reference encoder is configured to provide a first output signal;
   a measurement encoder coupled to the drive output shaft, wherein the reference encoder is configured to provide a second output signal;
   a first optical reader coupled to the reference encoder, wherein the first optical reader is configured to receive and/or transmit the first output signal; and
   a second optical reader coupled to the measurement encoder, wherein the second optical reader is configured to receive and/or transmit the second output signal.

2. The system of claim 1, wherein the internal shaft, the drive input shaft, and the drive output shaft are aligned along the common axis.

3. The system of claim 1, wherein the flexure is configured to provide an angular deflection upon application of torque to the drive input shaft.

4. The system of claim 3, wherein the angular deflection results in a phase difference between the first output signal of the reference encoder and the second output signal of the measurement encoder.

5. The system of claim 1, wherein the reference encoder and the measurement encoder are rotatably disposed about a common axis.

* * * * *